US007832520B2

(12) United States Patent
Murakami et al.

(10) Patent No.: US 7,832,520 B2
(45) Date of Patent: Nov. 16, 2010

(54) WORK VEHICLE

(75) Inventors: Takahisa Murakami, Iyo-gun (JP); Kiyoaki Suizu, Iyo-gun (JP); Tomoaki Watanabe, Iyo-gun (JP); Tomoaki Kondo, Iyo-gun (JP); Junichi Oshita, Iyo-gun (JP)

(73) Assignee: Iseki & Co., Ltd., Matsuyama-shi (JP)

( * ) Notice: Subject to any disclaimer, the term of this patent is extended or adjusted under 35 U.S.C. 154(b) by 385 days.

(21) Appl. No.: 11/885,293

(22) PCT Filed: Mar. 7, 2006

(86) PCT No.: PCT/JP2006/304341

§ 371 (c)(1),
(2), (4) Date: Aug. 29, 2007

(87) PCT Pub. No.: WO2006/095720

PCT Pub. Date: Sep. 14, 2006

(65) Prior Publication Data

US 2008/0315559 A1    Dec. 25, 2008

(30) Foreign Application Priority Data

Mar. 7, 2005  (JP)  ............... 2005-062880
Dec. 19, 2005 (JP)  ............... 2005-364556

(51) Int. Cl.
*B60K 28/10* (2006.01)
*F16H 59/50* (2006.01)
(52) U.S. Cl. ............... 180/338; 180/53.1; 180/369; 475/204; 701/50; 701/51; 701/60
(58) Field of Classification Search ............ 280/446.1; 180/338, 364, 53.1, 369; 701/50, 51, 61; 475/204, 216
See application file for complete search history.

(56) References Cited

U.S. PATENT DOCUMENTS

| 4,630,685 | A | * | 12/1986 | Huck et al. | ............... 172/7 |
| 6,030,311 | A | * | 2/2000 | Osumi | ............... 476/42 |
| 6,063,003 | A | * | 5/2000 | Kubota et al. | ............... 477/43 |
| 6,138,069 | A | * | 10/2000 | Ellertson et al. | ............... 701/50 |
| 6,181,020 | B1 | * | 1/2001 | Uchida et al. | ............... 290/40 C |
| 6,217,473 | B1 | * | 4/2001 | Ueda et al. | ............... 475/216 |
| 6,317,672 | B1 | * | 11/2001 | Kuramoto et al. | ............... 701/51 |
| 6,405,115 | B2 | * | 6/2002 | Taniguchi et al. | ............... 701/51 |
| 6,665,601 | B1 | * | 12/2003 | Nielsen | ............... 701/50 |
| 6,937,930 | B2 | * | 8/2005 | Pirotais | ............... 701/54 |

(Continued)

FOREIGN PATENT DOCUMENTS

JP    8-74995    3/1996

(Continued)

*Primary Examiner*—Paul N Dickson
*Assistant Examiner*—James English
(74) *Attorney, Agent, or Firm*—Hamre, Schumann, Mueller & Larson, P.C.

(57) ABSTRACT

Disclosed is a working vehicle capable of working and driving in stable condition while suppressing the adverse effect caused by the load variation such as sudden dashing from an associated ground working implement. The working vehicle comprises a controller for controlling the variator ratio of its toroidal mechanism to oppose the variation of the load when the toroidal mechanism is loaded on its output side. The controller adjusts the variator ratio appropriately when the engine starts.

4 Claims, 19 Drawing Sheets

U.S. PATENT DOCUMENTS

| | | | |
|---|---|---|---|
| 7,058,495 B2 * | 6/2006 | Budde et al. | 701/50 |
| 7,160,220 B2 * | 1/2007 | Shinojima et al. | 475/208 |
| 2003/0083170 A1 * | 5/2003 | Ooyama | 475/216 |
| 2003/0109349 A1 * | 6/2003 | Teraoka et al. | 475/214 |

FOREIGN PATENT DOCUMENTS

| | | |
|---|---|---|
| JP | 9-169224 | 6/1997 |
| JP | 10-164908 | 6/1998 |
| JP | 10-164908 A * | 6/1998 |
| JP | 2002-320402 | 11/2002 |
| JP | 2003-74659 | 3/2003 |
| JP | 2004-237767 | 8/2004 |

\* cited by examiner (a)

(b)

(a)

(b)

(a)

(b)

(a)

(b)

(a)

(b)

WORK VEHICLE

BACKGROUND OF THE INVENTION

1. Field of the Invention

The present invention relates to a working vehicle equipped with a ground working implement or cultivate machinery and a toroidal type of continuously variable transmission, which is capable of controlling the variator ratio in the toroidal mechanism for infinite variable-speed driving.

2. Prior Art

A working vehicle equipped with a ground working implement such as a combination of a cultivate tractor and a rotary cultivator is apt to suddenly produce a strong driving force in the forward direction at the outset when the rotary cultivator hits against a relatively hard soil in the cropland. The resultant sudden drive is the cause for unstable operation, accompanying uncontrollable acceleration. In the hope of solving this problem a driving speed control for the working vehicle is proposed in Patent Document 1.

The proposed driving speed control is so designed that the trunnion of the continuously variable transmission is responsive to any dashing(walking out) move when detected for making an associated hydraulic motor controllably rotate the trunnion, thereby suppressing the undesired speed variation.

Patent Document 2 proposes a working vehicle such as a cultivate tractor equipped with a PTO shaft for producing a working power and with a variable drive transmission for variably controlling the driving force, which variable drive transmission comprises a full-toroidal type of transmission contained in the transmission case. Specifically, the variable driving force is transferred from the outputting discs of the toroidal transmission to the intermediate transmission shaft via the planet gear mechanism. The intermediate transmission shaft is arranged parallel to the output discs. This arrangement effectively attains a relatively wide speed control and a forward and reverse drive with the null rotary cultivator power produced at its geared neutral position. At the same time, the simplification and downsizing in structure is advantageously attained by eliminating the main clutch from the transmission. Also advantageously, in the proposed variable drive transmission the toroidal transmission mechanism is so controlled that at the time of making the implement stop the geared neutral position may be reached to make the rotary cultivator power stop with the result that the vehicle body remains in the state of being stabilized at the time of starting next time. In case there is any deviation from the geared neutral position in the toroidal transmission when the working is made to stop, the initializing control is performed to bring the toroidal transmission to the controlled position where the deviation from the geared neutral position is reduced, thus putting the vehicle body in the state of being stabilized at the subsequent startup.

Patent Document 1: Patent Application Laid-Open No. 2002-320402
Patent Document 2: Patent Application Laid-Open No. 2003-74659

DISCLOSURE OF THE INVENTION

Problem to be Solved by the Invention

The variator of the toroidal type of continuously variable transmission performs a required power transmission at a selected rotary cultivator ratio, which varies with the tilt angle, thus controlling the power appropriately to meet the variable load. Thus, it can effectively provide an increased power transmission at a reduced speed. The ground working implement such as a rotary cultivator is likely to produce a variable driving or resisting power, and then, the working vehicle is disadvantageously subjected to a significant speed variation In the toroidal type of transmission mechanism the power from the engine is applied to the hydraulic pump, which drives the working oil for power transmission. At the outset, therefore, the power transmission control cannot be fully attained before the hydraulic pump is put in complete operation. If there is any deviation from the geared neutral in the toroidal transmission at the termination of the previous working, the vehicle body is apt to shake or move a short distance at the startup, thus taking a certain length of time for the vehicle body to be stabilized.

The object of the present invention is to provide a working vehicle which can effectively suppress the loading variation due to some exterior factors affecting the variator mechanism of the toroidal type of continuously variable transmission, such as adverse effects caused by the ground working implement or the power shaft, so that the stable control may be assured.

Means for Solving the Problem

One aspect of the invention is a working vehicle having a ground working implement (R) articulated with the vehicle body comprising a toroidal type of transmission (5a) included in the vehicle body, the transmission being mechanically engaged to the ground working implement to operate the machine while driving the vehicle, characterized in that it further comprises a controller (C) to control the variator ratio in the toroidal mechanism for variable-speed driving, the controller being responsive to any load variation on the output side of the toroidal type of transmission for controlling the variator ratio against the load variation.

Another aspect of the invention is a working vehicle according to claim 1 wherein the controller (C) is so designed that it may change the variator ratio in response to the propelling force in the direction in which the working vehicle is advancing or to the counter force both produced in the ground working implement at the beginning of the working.

Thus, the vehicle speed can be controlled at the outset.

Another aspect of the invention is a working vehicle according to claim 1 wherein the controller (C) is so designed that it is responsive to the lowering of the elevating type of ground working implement down to the working level or the clutch engagement in the clutch-operating type of ground working implement for finishing the required control of the variator ratio within a predetermined length of time from the beginning of the ground working. With this arrangement the vehicle speed is controlled within a predetermined length of time from the outset.

Another aspect of the invention is a working vehicle according to claim 1 wherein the controller (C) is so designed that it may change the variator ratio toward suppression of the undesired propelling force or the counter force produced in the ground working implement. Thus, the variation of the vehicle velocity is made to oppose the undesired propelling force or the counter force produced in the ground working implement.

Another aspect of the invention is wherein the controller (C) is so designed that it may change the sensitivity of the variation control of the variator ratio in response to the beginning of the ground working. Thus, how quickly the instantaneous vehicle speed is changed is determined to meet the driving condition at the outset.

Another aspect of the invention is wherein the controller (C) is so designed that the toroidal mechanism (5a) for controlling the vehicle speed may be brought to the geared neutral position in response to the starting of the engine, in which geared neutral position the outputting speed is made to stop irrespective of the inputting speed, the control toward the geared neutral position being performed with the PTO clutch (124) disengaged, the PTO clutch being on the power-transmission path to the ground working implement. Thus, in response to the starting of the engine the controller (C) helps the toroidal mechanism reach the geared neutral position with the PTO clutch disengaged.

Another aspect of the invention is wherein the controller (C) is so designed that the toroidal mechanism (5a) for controlling the vehicle speed may be brought to the geared neutral position in response to the starting of the engine, in which geared neutral position the outputting speed is made to stop irrespective of the inputting speed, the control toward the geared neutral position being performed with the 4WD clutch (38) disengaged. Thus, in response to the starting of the engine the controller (C) helps the toroidal mechanism reach the geared neutral position with the 4WD clutch disengaged.

Another aspect of the invention is wherein the controller (C) is so designed that the toroidal mechanism (5a) for controlling the vehicle speed may be brought to the geared neutral position in response to the starting of the engine, in which geared neutral position the outputting speed is made to stop irrespective of the inputting speed, the control toward the geared neutral position being performed with the elevating type of ground working implement (R) prevented from rising or lowering. Thus, in response to the starting of the engine the toroidal mechanism is smoothly transferred to the geared neutral position thanks to the dormant ground working implement.

Another aspect of the invention is a working vehicle wherein the controller (C) is so designed that the toroidal mechanism (5a) for controlling the vehicle speed may be brought to the geared neutral position in response to the starting of the engine, in which geared neutral position the outputting speed is made to stop irrespective of the inputting speed, the control toward the geared neutral position being performed with the rolling control in the ground working implement (R) kept dormant. Thus, in response to the starting of the engine the toroidal mechanism is smoothly transferred to the geared neutral position thanks to the dormant ground working implement.

Another aspect of the invention is a working vehicle according to claim 1 wherein it further comprises an articulated arm (3) coupling the vehicle body with the ground working implement (R) to rotate, raise and lower the same, and an angular sensor (3s) to detect the speed angle of the articulated arm (3), the control being so designed that the variator ratio may be responsive to the so detected descent of the ground working implement for keeping the vehicle speed constant. Thanks to the constant velocity control the working vehicle can run at a given fixed speed irrespective of the varying load in the front loader or trailer working mode.

Another aspect of the invention is a working vehicle according to claim 1 wherein it further comprises an articulated arm (3) coupling the vehicle body with the ground working implement (R) to rotate, raise and lower the same, and an angular sensor (3s) to detect the speed angle of the articulated arm (3), the control being so designed that the variator ratio may be responsive to the so detected descent of the ground working implement for keeping the variator ratio constant. Thanks to the constant ratio control the working vehicle can dig and turn over a soil at an equal pitch.

Another aspect of the invention is a working vehicle according to claim 1 wherein it further comprises selection means (4a) for selecting one or more working-and-driving controls among the constant speed control, constant ratio control and constant torque control. Thus, the working vehicle can selectively work under the constant speed control, constant ratio control and constant torque control as desired.

ADVANTAGES PROVIDED BY THE INVENTION

The working vehicle structure can effectively suppress undesired variation of the vehicle speed caused by the varying load by controlling the variator ratio in the speed control toroidal mechanism when it is loaded on its output side.

The working vehicle structure can effectively control the vehicle speed in pace with the operation of the ground working implement, thus suppressing the load variation, which is likely to be caused by the propelling force or the counter force produced at the beginning of the ground working, and accordingly moderating the sudden acceleration or deceleration in the vehicle speed, thus allowing the working vehicle to run smoothly in stable condition.

The working vehicle structure can effectively control the speed change ratio within a predetermined length of time from the beginning of the ground working, which is represented by the lowering of the elevating type of ground working implement down to the working level, or by the clutch engagement in the clutch-operative type of ground working implement. Thus, the load variation, which is likely to be caused by the propelling force or the counter force produced at the beginning of the ground working, can be effectively suppressed, and accordingly the sudden acceleration or deceleration in the vehicle speed can be reduced with the result that the working vehicle runs smoothly in stable condition.

The working vehicle structure helps the variation of the speed change ratio for the purpose of controlling the vehicle speed effectively oppose and cancel out the propelling force or the counter force produced in the ground working implement, thereby suppressing the sudden acceleration or deceleration in the vehicle speed.

The working vehicle structure can effectively change the control sensitivity in the speed change ratio for speed control, thereby efficiently reducing the sudden acceleration or deceleration in the vehicle speed.

The working vehicle structure is responsive to the starting of the engine for making the hydraulic control system change the variator ratio, allowing the toroidal transmission to work in the driving power transmission mode with the PTO clutch (24) disengaged until the geared neutral position has been reached, in which position the outputting speed is made to stop irrespective of the inputting speed. The PTO clutch (24) is disengaged until the geared neutral position is reached, thus allowing the hydraulic control system to help the working vehicle run in the stable condition at an earliest stage.

The working vehicle structure is responsive to the starting of the engine for making the hydraulic control change the variator ratio, allowing the toroidal transmission to work in the driving power transmission mode with the 4WD clutch (38) disengaged until the geared neutral position has been reached, in which position the outputting speed is made to stop irrespective of the inputting speed. The 4WD clutch is disengaged until the geared neutral position is reached, thus permitting the exclusive use of the hydraulic control system to help the working vehicle run in the stable condition at an earliest stage.

The working vehicle structure is responsive to the starting of the engine for making the hydraulic control change the variator ratio, allowing the toroidal transmission to work in the driving power transmission mode with the elevating cylinder (54) inoperative until the geared neutral position has been reached, in which position the outputting speed is made to stop irrespective of the inputting speed. The elevating cylinder is kept dormant until the geared neutral position is reached, thus permitting the exclusive use of the hydraulic control system to help the working vehicle run in the stable condition at an earliest stage.

The working vehicle structure is responsive to the starting of the engine for making the hydraulic control change the variator ratio, allowing the toroidal transmission to work in the driving power transmission mode with the rotary cultivator controlling cylinder (53) inoperative until the geared neutral position has been reached, in which position the outputting speed is made to stop irrespective of the inputting speed. The rotary cultivator controlling cylinder is kept dormant until the geared neutral position is reached, thus permitting the exclusive use of the hydraulic control system to help the working vehicle run in the stable condition at an earliest stage.

The working vehicle structure permits the stable driving control while being engaged in cultivating, thus keeping the working vehicle driving at a fixed speed even though the tractor load varies, and significantly improving the workability.

The working vehicle structure can provide a constant ratio control while the ground working implement is put in operation. Thus, the cultivating pitch can be kept constant, and the working vehicle can turn at a fixed speed. The workability and the feeling of working are improved.

The working vehicle structure permits a selection of working mode among the constant speed control, the constant ratio control and the constant torque control with the aid of selection means (4a) such as a switching device.

BEST MODE OF REDUCING THE INVENTION INTO PRACTICE

Referring to the accompanying drawings a working vehicle according to one embodiment of the present invention is described below.

Figure 1:
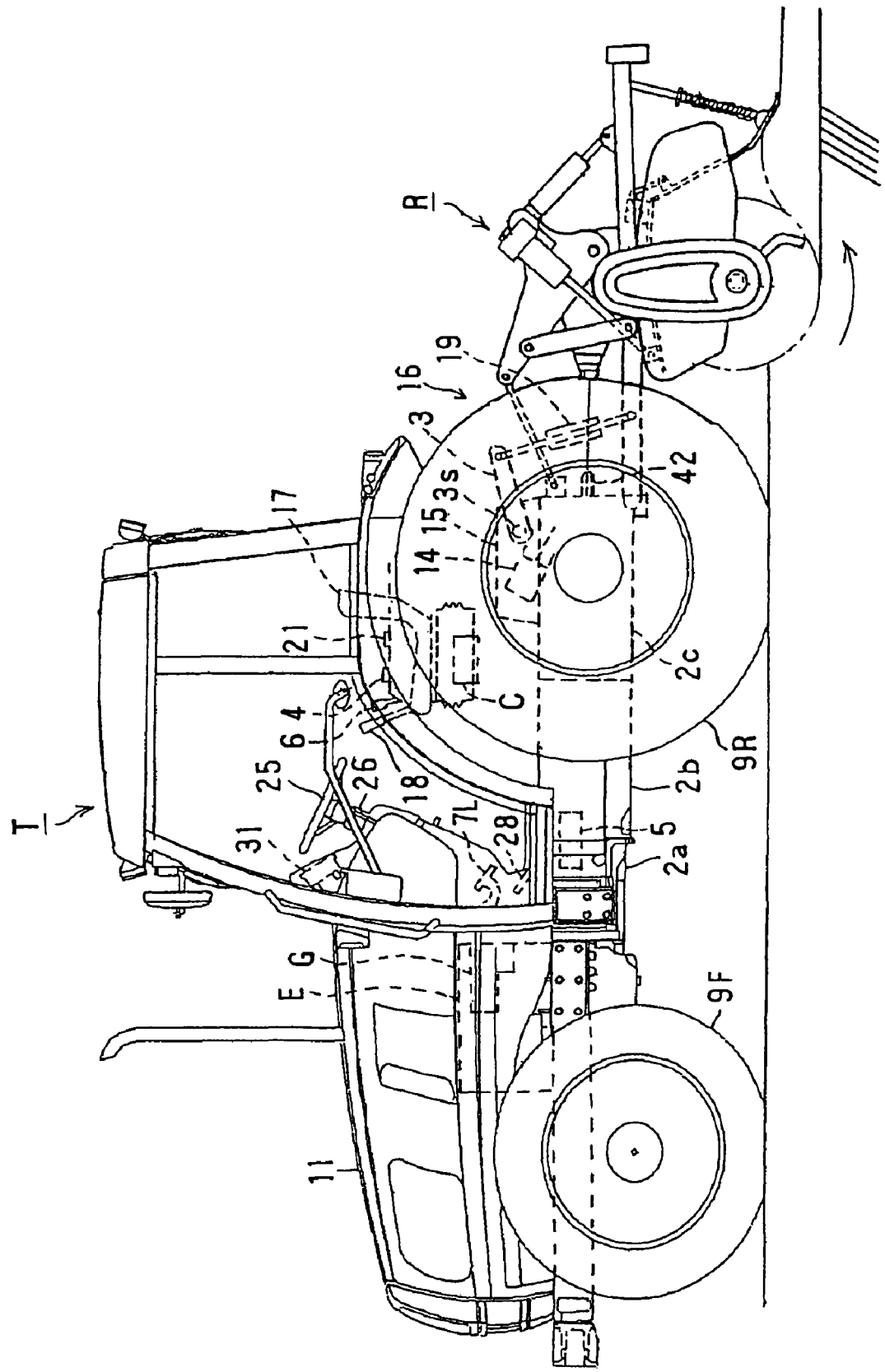
FIG. 1 is a side view of a cultivate tractor with a ground working implement.

First, a tractor T is described in structure. Referring to FIG. 1, the engine E is contained in the engine hood 11, and the rotating power is transmitted from the engine E to the rear wheel 9R or the front and rear wheels 9F and 9R through different transmission units, which are contained in the gear box. The gear box is composed of a front transmission case 2a, an intermediate transmission case 2b and a rear transmission case 2c.

The engine E is equipped with an accelerator position sensor, which is located close to the governor mechanism G. The engine shaft 12 has an engine speed sensor 13b mounted thereon.

The cylinder case 15 positioned on the rear side of the tractor body contains a hydraulic cylinder 14 for raising and lowering the ground working implement or the rotary cultivator R. The lifting arms 3 are arranged on both sides of the cylinder case 15, taking the part of elevating the rotary cultivator R. The telescopic motion of the piston in the cylinder 14 makes the lifting arms 3 raise, raise and lower, and the rotary cultivator R follows in motion via an associated three-point linkage mechanism 16. A lifting arm angle sensor is placed at the base of one of the lifting arms 3 to determine the height of the rotary cultivator. The elevating lever 18 is arranged on one side of the driver's seat, and a lever position sensor is placed at the base of the elevating lever 18 to determine the inclination of the elevating lever. The hydraulic cylinder 14 for elevating the rotary cultivator R is so driven that the detected lever angle may be equal to the detected lifting arm angle.

A lower linkage on either side of the three-point linkage mechanism 16 is engaged to the lifting arm 3 via the rolling hydraulic cylinder 19, and the telescopic motion of the piston in the cylinder 19 makes one or the other side of the ground working implement R rise or lower, thereby controlling the rolling posture of the ground working implement R. The telescopic motion of the piston in the cylinder 19 can be determined by a stroke sensor, which is located on the transmission case 2 and is engaged to the piston by a length of cable.

A steering wheel 25 for controlling the front wheels 9F is located ahead of the driver's seat 17, and a to-and-fro movement switching lever 26 and an accelerator lever for controlling the revolutions per minute of the engine E are located below the steering wheel 25. The accelerator lever is equipped with a lever holder mechanism having a friction material on the rotary cultivator base of the accelerator lever, and the lever is engaged to the governor mechanism G of the engine E via a length of cable. Thus, the throttle position in the engine E can be controlled as desired by changing the lever position.

Right and left brake pedals 7R and 7L and an accelerator pedal 28 are located below the steering wheel 25. The accelerator pedal 28 has a pre-loaded spring on its rotary cultivator base, applying the resilient force to the accelerator pedal 28 toward deceleration all the time, and the accelerator pedal 28 is engaged to the governor mechanism G of the engine E via a length of cable.

With this arrangement, the throttle position set and held by the accelerator lever determines the lower limit, and the revolutions per minute of the engine E can be raised in response to the depressing of the accelerator pedal 28. When the accelerator pedal 28 is released, it automatically returns to the original position, which is set by the accelerator lever.

Generally, in the ground working vehicle the transmission speed remains on the low-speed side while the ground working implement works, and the accelerator lever is set at the high-speed rotating position (the full-throttle position) to drive the vehicle at a fixed speed. On the other hand, when the vehicle is driving on the road or in the field, the transmission speed remains on the high-speed side, and the accelerator lever is set at the low-speed rotating position (close to the low idle position), while the accelerator pedal is depressed to control the revolutions per minute, that is, the vehicle speed.

An instrument panel 31 with a liquid crystal monitor is located ahead of the steering wheel 25, and the instrument panel has an instrument panel controller on its rear side. Thus, the information inputted into the controller appears on the liquid crystal monitor or causes a buzzer 32 to produce a buzzing sound for warning.

On one side of the driver's seat 17 there are an elevating lever 18 for adjusting the level of the ground working implement, a continuously variable transmission lever 6 capable of controlling the speed change ratio in the driving system transmission 5 (later described), a mode switching unit 4 for making a selection among the "traction", "loading" and "road-driving" modes, and a speed setting unit 21. The continuously variable, speed change lever 6 is equipped with a potentiometer type of sensor for determining the angle of the speed change lever 6. The controller C is responsive to the operation of the speed change lever 6 for changing the revolutions per minute of the driving system transmission 5.

A group of controller units for different functions together making up the controller C and an inclination sensor for use in controlling the rolling of the ground working implement are located below the driver's seat 17.

Figure 2:
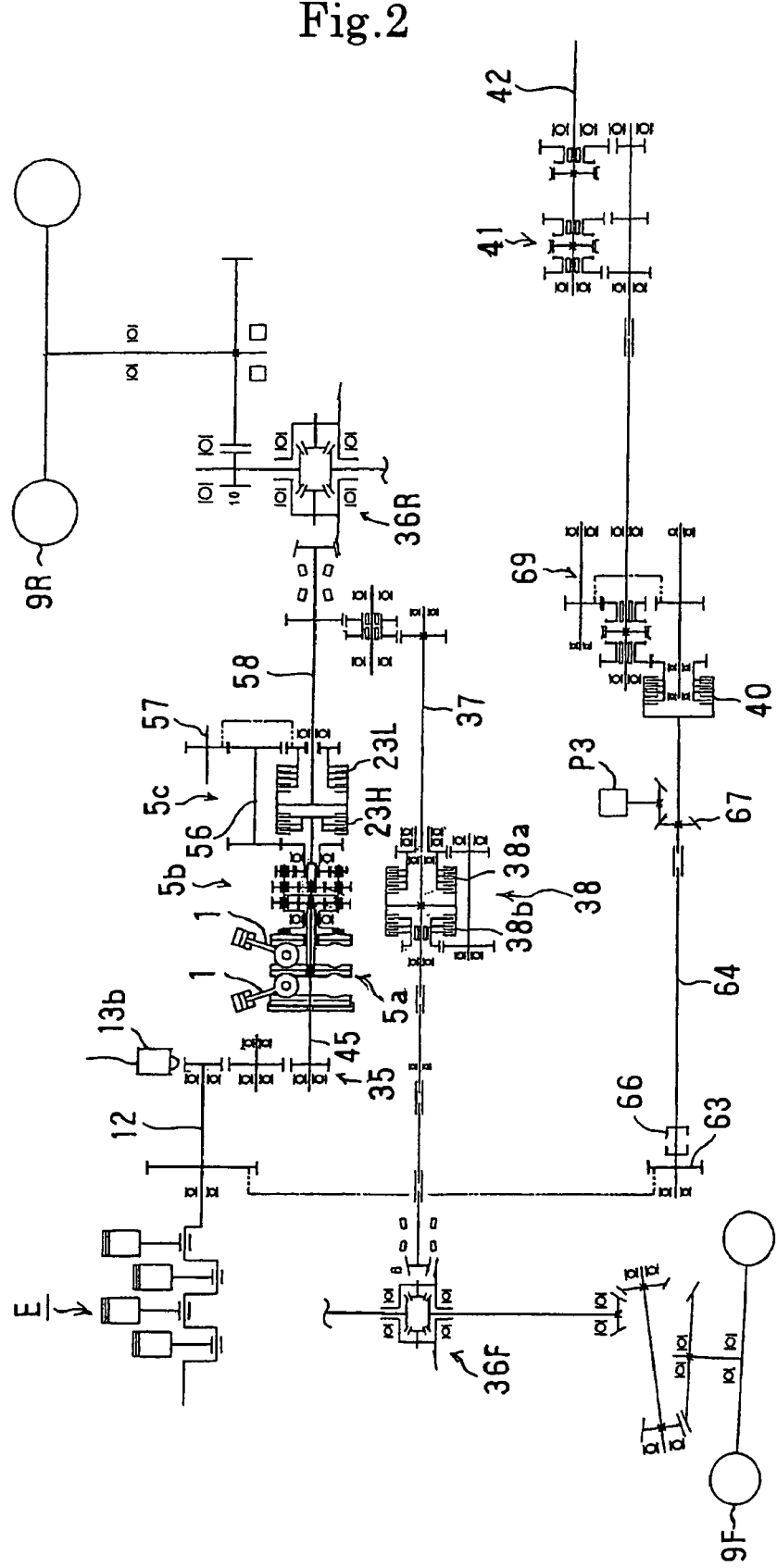
FIG. 2 is a development of the transmission system in the variable speed transmission.

Referring to FIG. 2, the power transmission path in the tractor T is described below. The rotating power from the engine "E" is divided into two power divisions, one power division being transmitted to the power take-off shaft (PTO shaft) 42 on the rear side of the vehicle body via the PTO system including a PTO clutch 40 and a PTO transmission 41, and the other power division being transmitted to the right and left rear wheels 9R via the gang of speed-reduction gears 35, the transmission 5 (comprising a toroidal type of continuously variable transmission 5a, a planet gear type of differential mechanism 5b and an high and low switching clutch mechanism 5c) and the rear wheel differential mechanism 36R. The rotating power outputted from the transmission 5 is transmitted to the right and left front wheels 9F via the front wheel propelling shaft 37 and the front wheel differential mechanism 36F.

In FIG. 2 a front wheel accelerating unit 38 comprises an equi-speed clutch 38a and an accelerating clutch 38b to make the front wheels 9F rotate at an increased speed when the tractor T turns.

(Transmission)

Figure 3:
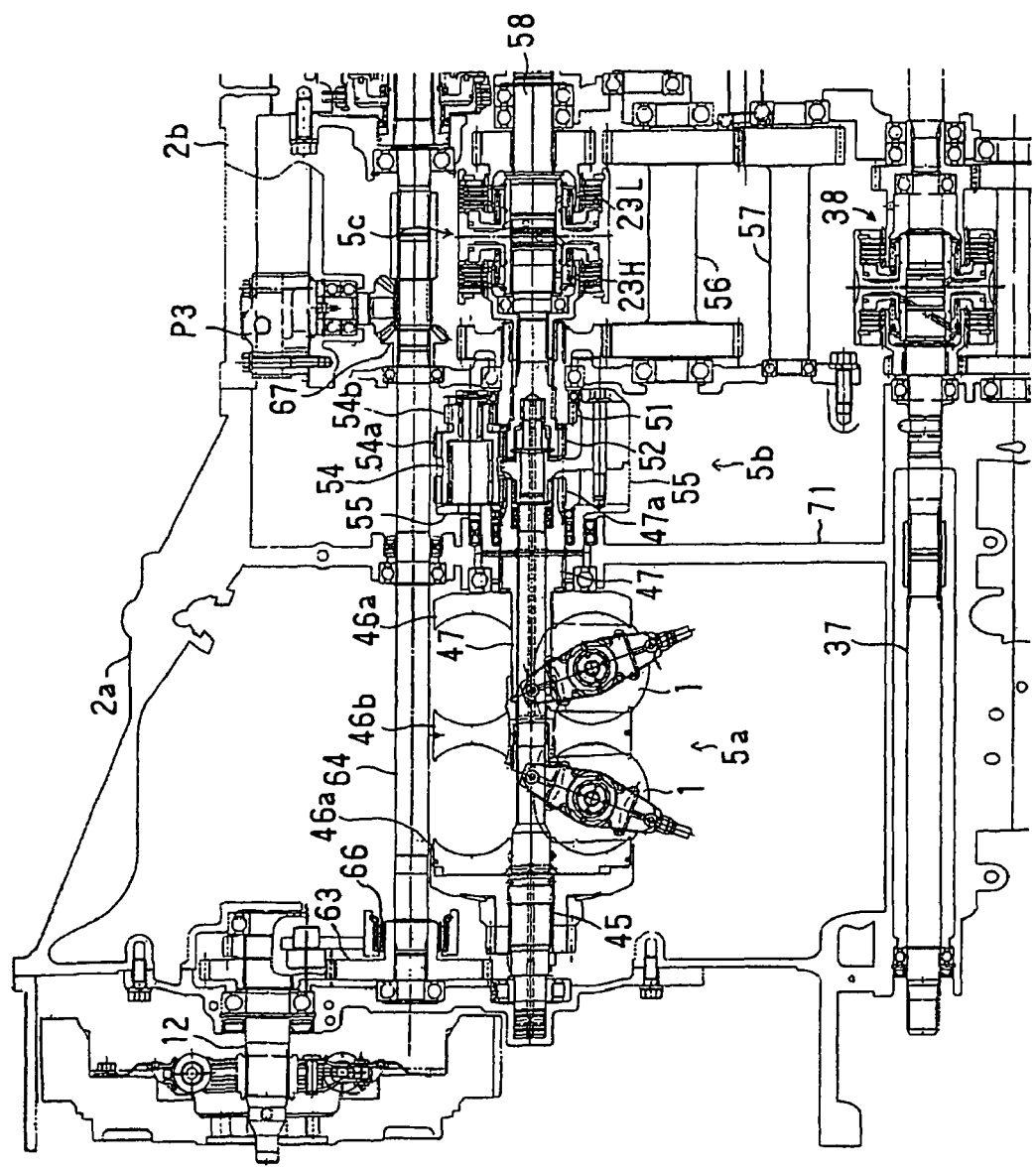
FIG. 3 is a longitudinal section of the variable speed transmission.

The propelling power transmission 5 is described below in detail. As seen from FIG. 3, the toroidal type of continuously variable transmission 5a comprises a variator input shaft 45 functioning as a propelling power put-in shaft, two discs 46a integrally engaged to the power put-in shall 45 to rotate together, a tubulous variator output shall 47 coaxially encircling the variator input shaft 45 for transmitting the propelling power to the downstream, a downstream planet gear type of differential mechanism 5h, and a disc 46b integrally engaged to the tubulous output shaft 47. All of these elements are aligned on a common axle. Rollers each supported by an associated cylinder piston are sandwiched between each of the outer input discs 46a and the inner output disc 46h (together making up a variator mechanism). The rollers and associated cylinder pistons (hereinafter referred to as "power rollers 1") are hydraulically changed in position. Consequently the inclination angles of the rollers change, and accordingly the power transmission ratio from the input discs 46a to the output disc 46h changes. Thus, the revolutions per minute of the variator output shaft 47 changes.

The planet gear type of differential mechanism 5b comprises the variator output shaft 47, a low-speed output gear 51 for transmitting propelling power to a downstream low-speed clutch 23L and a high-speed output gear 52 for transmitting propelling power to a downstream high-speed clutch 23H. The output sun gear 47a at the rear end of the variator output shaft 47 meshes with three planetary gears 54. The large and small planetary gears 54a and 54b mesh with high-speed and low-speed output gears 52 and 51 respectively.

The three planetary gears 54 are supported by a common carrier 55, and are adapted to rotate around the output sun gear 47a. The carrier 55 is integrally engaged to the rear part of the variator input shaft 45 to rotate as a whole. Thus, the carrier 55 and the downstream input disc 46a rotate as a whole.

With this arrangement the power rollers 1 are made to change in inclination angle, thereby making the variator input shaft 45 different from the variator output shaft 47 in speed. Accordingly the speed of the planetary gears 54 changes, and the speed transmitted from the high-speed and low-speed output gears 54a and 54b associated with the planetary gears 54 changes.

The high and low switching clutch mechanism 5c comprises a high-speed switching clutch 23H for transmitting the speed of the high-speed output gear 54a downstream, and a low-speed switching clutch 23L for transmitting the speed of the low-speed output gear 54b downstream via the first counter shaft 56 and the second counter shaft 57 respectively. These clutches 23H and 23L are engaged or disengaged by adjusting the hydraulic pressure in the associated proportional pressure control valves 23v and 23v respectively.

With this arrangement a selection can be made between the speed from the high-speed output gear 54a and the speed from the low-speed output gear 54b of the planetary gears 54 to rotate the transmission shaft 58 of the rear wheel differential mechanism 36R.

In the propelling system of transmission 5 the speed of the engine E is transmitted to the toroidal type of continuously variable transmission 5a where the planetary gear type of differential mechanism 5b combines the speed of the variator input shaft 45 with the speed of the variator output shaft 47. In the state of the low-speed clutch 23L being engaged the inclination angle of the power rollers 1 are changed so that the output speed changes clockwise or counterclockwise infinitely in the low-speed range, and hence, the tractor T moves back and forth at a selected speed appropriate for ground working. Conversely in the state of the high-speed clutch 23H being engaged the inclination angle of the power rollers 1 are changed, so that the output speed changes clockwise and counterclockwise infinitely in the high-speed range, and hence, the tractor T run at a selected speed appropriate for driving on road.

Now, the PTO system of transmission is described below in detail. The output speed from the engine E is transmitted to the PTO transmission gear 63 located at the front part of the front transmission case 2a, and is transmitted rearward via the PTO transmission shaft 64, which is integrally engaged to the PTO transmission gear 63. The PTO transmission gear 63 is equipped with a one-way clutch 66 to restrict its speed to one direction. Thus, the gear 63, those gears meshing therewith all the time and the axles integrally engaged therewith are prevented against reverse, which otherwise, would be caused by the reversing of the output shaft 12 of the engine E or the undesired inertia speed of the PTO shaft 42 subsequent to the stopping of the engine. This helps the rollers sandwiched between the input and output discs 46a and 46b stay stable.

The PTO transmission shaft 64 has a bevel-like, pump drive gear 67 located at the rear end. When the gear 67 is rotated, a third pump P3 mounted on the mid-transmission case 2b is driven. A PTO clutch 40 is mounted on the PTO transmission shaft 64 between the high and low switching clutch mechanism 5c and the rear wheel differential mechanism 36R as viewed traversedly. The speed passing through the clutch 40 is switched from clockwise to counterclockwise and vice versa on the way to the downstream PTO transmission 41. The PTO transmission 41 is a three-step variable (low-middle-high-variable), constant mesh gear type of transmission, and it can be gear-switched by the shift lever close to the driver's seat.

(Hydraulic System for Transmission)

Figure 4:
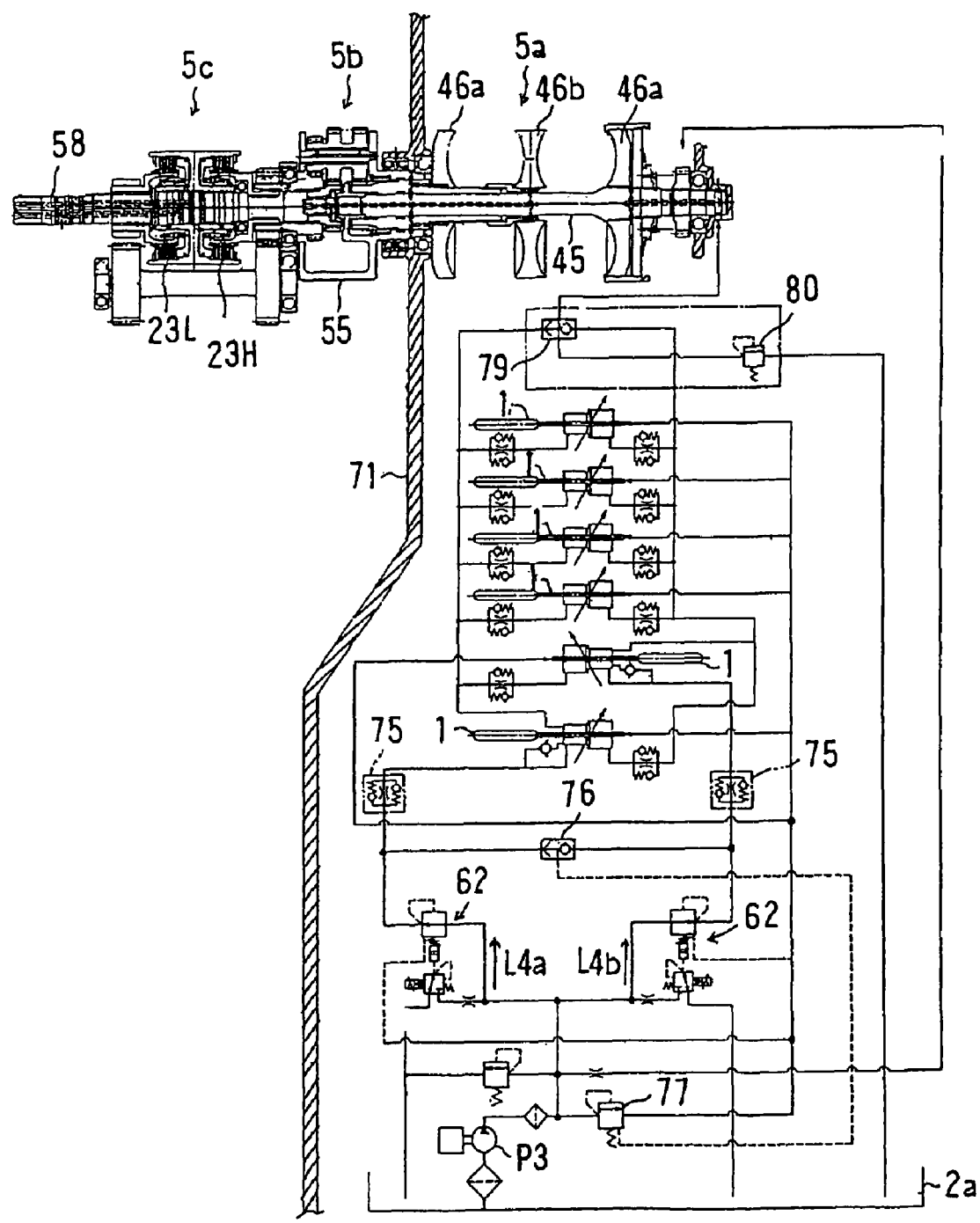
FIG. 4 is a hydraulic control system associated with the variable speed transmission.

Referring to FIG. 4, the front transmission case 2a has front and rear compartments separated by its partition 71. The PTO transmission gear 63, one-way clutch 66 and the toroidal type of continuously variable transmission 5a are arranged in the front compartment whereas the planetary gear type of differential mechanism 5b, the high and low switching clutch mechanism 5c, the pump drive gear 67 and the PTO clutch 40 are arranged in the rear compartment. The front compartment is loaded with a special working oil to feed to each cylinder pertaining to the power roller 1 whereas the rear compartment is loaded with a standard working oil to feed to other actuators such as the elevating hydraulic cylinder 14 and the rolling hydraulic cylinder 19.

A hydraulic pump P3 draws the special working oil from the front compartment of the front transmission case 2a to supply to the cylinder-and-piston rooms of the power rollers 1 via two downstream channels L4a and L4b each having a proportional flow control valve 62 and a damper mechanism 75, which comprises a check valve and a choke. The parallel-arranged power roller driving hydraulic channels L4a and L4b are engaged intermediate between the damper mechanism 75 and the proportional flow control valve 62 of each hydraulic channel by a shuttle valve 76, which comprises a check valve. With this arrangement the pumped oil is partly drawn from the high-pressure circuit. The so drawn oil is used as a pilot pressure to control the opening degree of the downstream relief valve 77.

Likewise, another shuttle valve 79 is included in a traverse channel, which is parallel to the channels to feed pumped oil from the power roller driving hydraulic channels L4a and L4b to the cylinder rooms of the power rollers 1. The pumped oil thus drawn by the shuttle valve 79 is kept constant in pressure by an associated relief valve 80, and is used as an end front loader pressure to push the input and output discs 46a and 46b close toward in the axial direction. With this arrangement as the proportional flow control valves 62 feed the working oil to drive the power rollers 1, the input and output discs 46a and 46b increase the pushing pressure appropriately for the purpose.

(Controller Structure)

Figure 5:
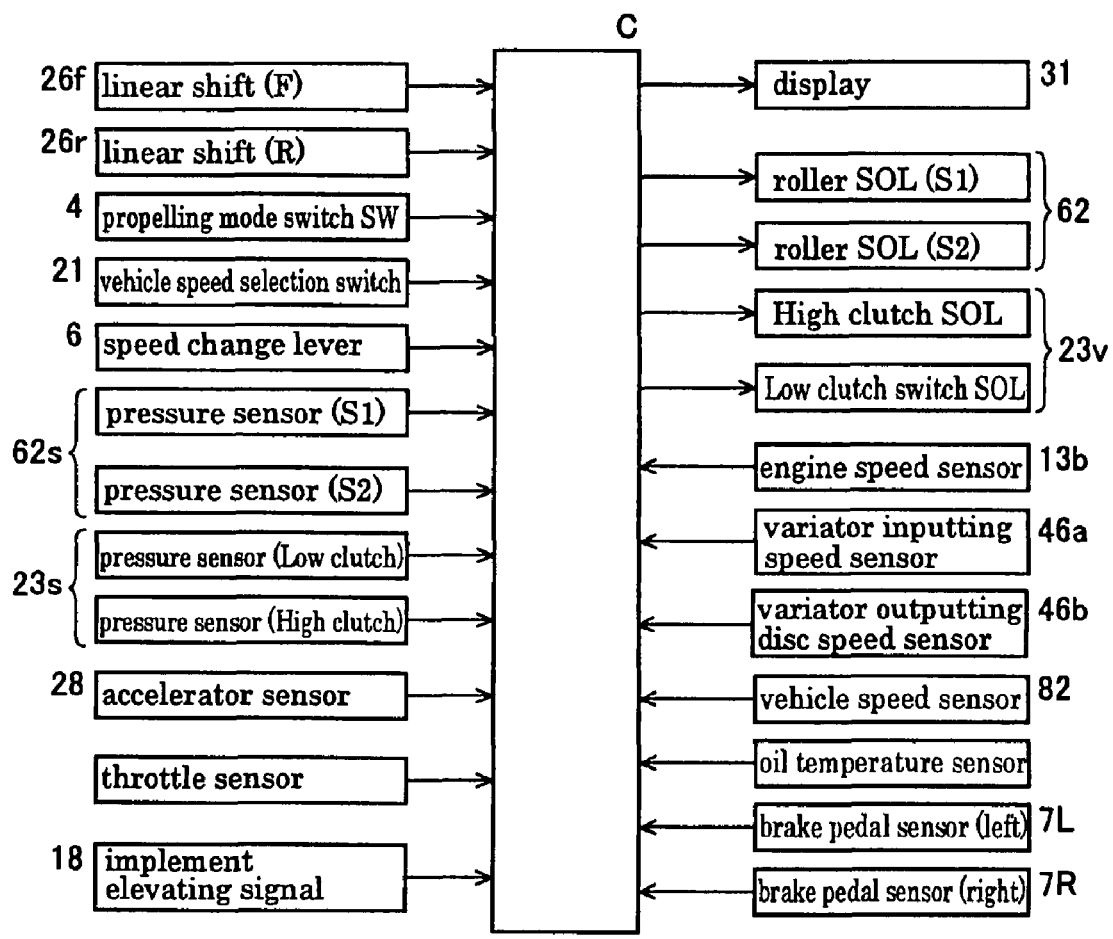
FIG. 5 shows a controller having different devices on its input and output sides.

Referring to FIG. 5, on the input side of the controller C there appear different signals from: F and R linear shift sensors 26f and 26r to determine the lever position of the to-and-fro movement switching lever 26; a sensor for the speed change lever 6 to input the signal representing the speed change position; a driving mode switching unit 4; a working speed selecting switch 21; sensors for the left and right brake pedals 71. and 7R; an engine speed sensor 13b; a variator input speed sensor 46a; a variator output speed sensor 46b; a pressure sensor 62s for the power roller drive cylinder; a pressure sensor 23s for the Hi-Lo clutch; a sensor for the accelerator pedal; and a vehicle speed sensor 82 to detect the speed of the rear wheels 9R and the like. On the output side of the controller it is engaged to: a monitor display 31; a solenoid 62 associated with the proportional flow control valve for controlling the inclination angle of the power roller 1; solenoids associated with the control valves for the Hi-clutch and Lo-clutch and the like.

When it is desired that the working vehicle is made to stop, the variators 5a of the power rollers 1 are so controlled under the controller C that their inclination angles may be changed toward the geared neutral position in which the change speed ratio corresponds to the stopping velocity according to the low regime. This arrangement provides a main clutch-free transmission. When the engine is made to start, the start control is performed, including the to-and-fro movement control toward the geared neutral-position.

When the working vehicle is driving on road, the vehicle speed is made to vary with the speed ratio of the toroidal type of variator 5a, which is determined by the inclination angle of the power rollers 1 in response to the instantaneous accelerator pedal position, while the Hi-clutch 23H or Lo-clutch 23L is selectively engaged or disengaged for the required speed output regime.

In the rotary cultivator working mode a required control is made on the ground working implement R in respect of the variator ratio to keep pace with the ground working and suppress the sudden acceleration (dashing) or deceleration of the vehicle which otherwise would be caused at the very instant that the ground working implement R lands on the ground.

Figure 6:
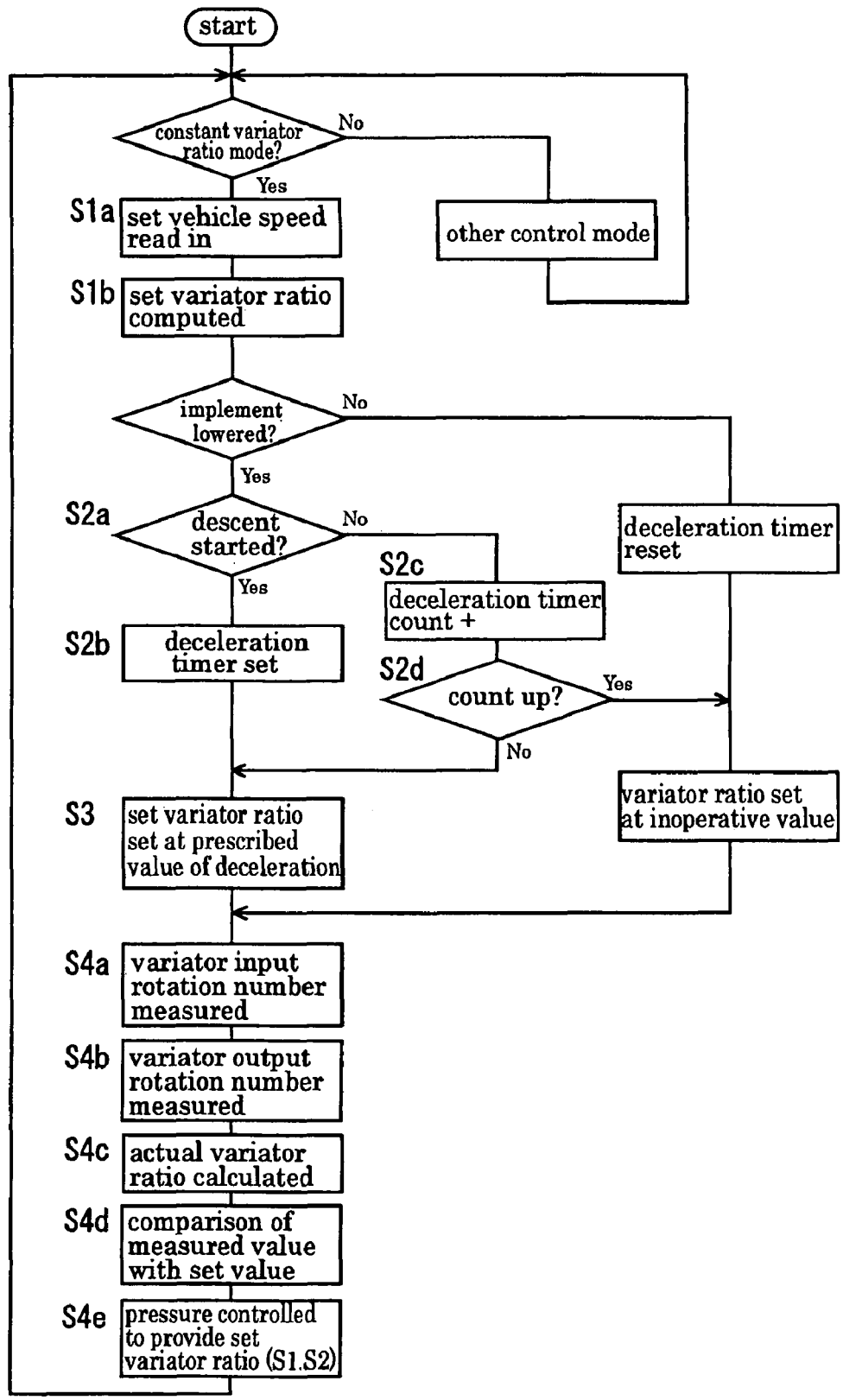
FIG. 6 is a flow chart depicting how the variator ratio control is effected.

Specifically referring to FIG. 6, the required control is performed as follows: first, the reading-in of the set vehicle speed (S1a) and the computing of the set variator ratio; in case the implement R lowers, the speed-decreasing timer is set when the working operation starts, allowing the count to increase with time until the speed-decreasing timer has counted up (S2a to S2d), the whole while the predetermined speed-decreasing setting procedure being performed in respect of the variator ratio (S3). Then, the pressure control procedure on the roller cylinder follows to reach the so set variator ratio (S4a to S4c).

Figure 7:
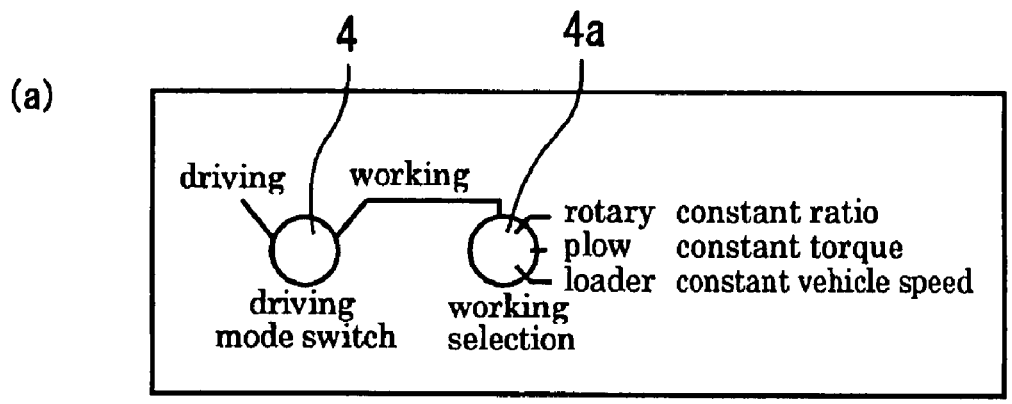
FIG. 7(a) shows a switch panel.
FIG. 7(b) is a diagram representative of how the variator ratio is controllered.
Figure 7:
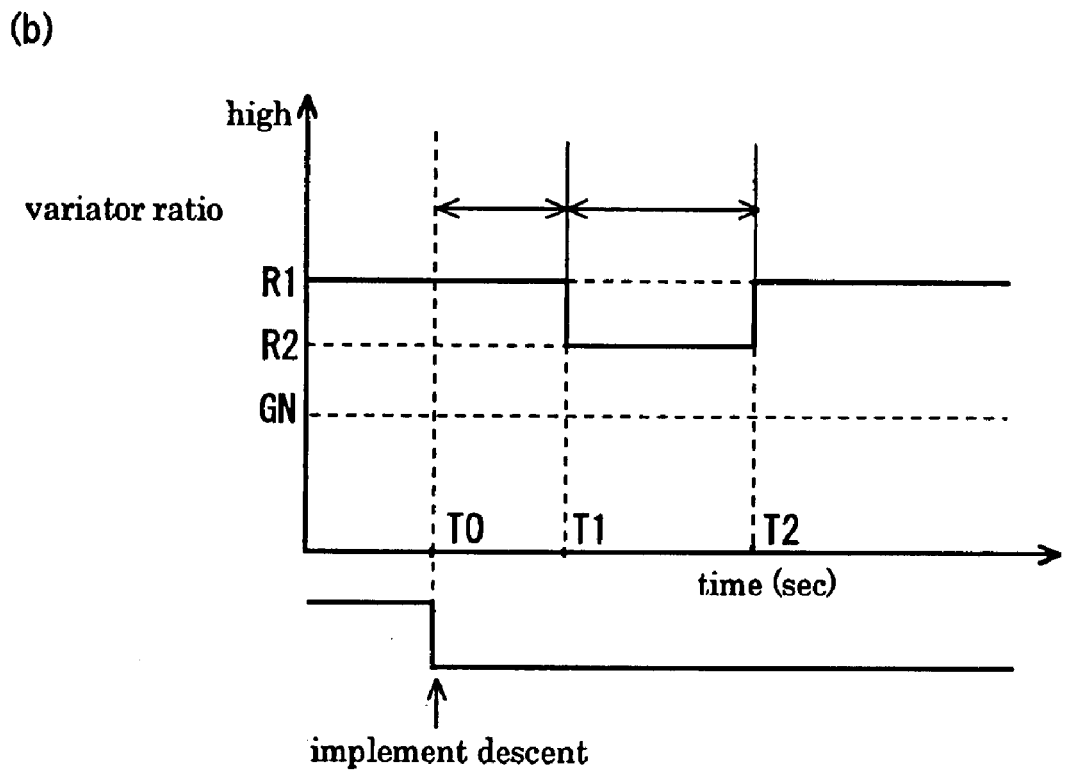

The above described control procedure is effected by selecting the "rotary cultivator" working among different "workings" by the mode switching device 4 (FIG. 7(a)), thereby adjusting the variator ratio in pace with the instantaneous operation of the ground working implement "R". Specifically the variator ratio to be set is determined from the vehicle speed (for example 2 km/h) calculated from the rated value of revolutions per minute of the engine set by the driver. The "to be set" variator ratio, however, is set at a small value within a predetermined length of time (for example, 1 to 2 seconds) counted from the instant that the ground working implement starts lowering. Thus, the instant rise of the vehicle speed is prevented. Specifically, as seen from the control diagram of the variator ratio (FIG. 7(b)), the variator ratio is adjusted on the speed-reduction side (R1→R2) for a fixed period (T1→T2) following a given waiting period counted from the instant T0 that the ground working implement starts lowering. The waiting period (T0→T1) varies with the lowering speed. In the "working" mode a selection switch (selection means) 4a is actuated to make a selection between "constant ratio", "constant torque" and "constant vehicle speed", thus selecting the most appropriate propelling control for the selected working mode.

As seen from the above, the dashing in the ground working vehicle is suppressed as effectively as a four-wheel drive tractor using a stationary gearbox, which is characteristic of least dashing. Thus, the toroidal type of continuously variable transmission is stabilized in driving. As a matter of fact, the variator of the toroidal type of continuously variable transmission was apt to move and change the speed change ratio as a consequence of loading the working vehicle. This problem is satisfactorily solved.

Another controlling method is the constant speed control in which the targeted vehicle speed is gradually modified by controllably operating the accelerator pedal in pace with the rising or lowering of the rotary cultivator "R". Specifically a negative torque is generated to oppose the dashing when the rotary cultivator R is lowering whereas a positive increased torque is generated to oppose the dashing and improve the workability when the rotary cultivator R is rising and lowering.

Specifically the controller is constructed as follows: when the rotary cultivator R turns, the controller is made sensitive by increasing the gain in pace with the driving load variation, whereas at the instant that the rotary cultivator R lowers, the vehicle speed is set at one half of the target vehicle speed, and the ordinary vehicle speed control is recovered in a predetermined length of time.

Figure 8:
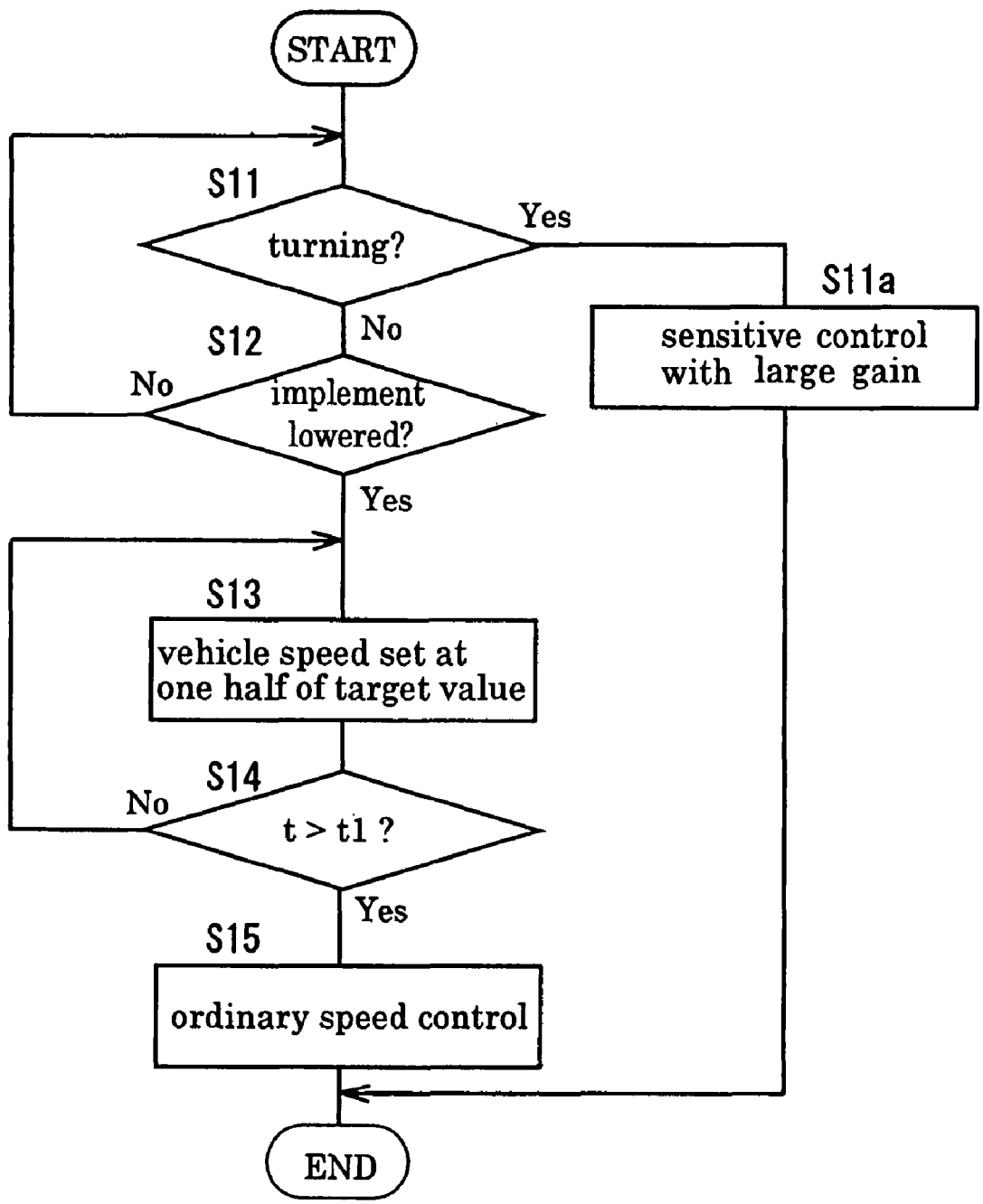
FIG. 8 is another flow chart representative of how the variator ratio is controlled.

The specific procedure is shown in FIG. 8. A decision as to whether or not tractor is turning is made (S11), and in the affirmative case, the sensitivity is increased by increasing gain (S11a). Otherwise, in the negative case, a decision as to whether or not the rotary cultivator is being lowered is made (S12). In the affirmative case, the vehicle speed is set at one half of the target vehicle speed until expiration of the predetermined length of time t1 (S13, S14), and then, the ordinary vehicle speed control procedure is restored (S15).

As a substitute for the decision of the lowering of the rotary cultivator R (S12) a decision of the lowering of the rotary cultivator R below a certain level may be equally used for anti-dashing control. Otherwise, in place of the setting at one half of the target vehicle speed (S13) the geared neutral control procedure may be performed to prevent any dashing.

As for the setting at one half of the target vehicle speed (S13) in the above described procedure a decision making of PTO "ON" may be added as one extra condition, and then the target vehicle speed may be made to gradually change with the PTO speed for preventing any dashing.

As for the control via the gain control: the gain is made to change in response to the rising or lowering of the rotary cultivator R. Specifically, while driving and turning on road, the gain control is made sensitive by increasing the gain in pace with the driving load variation. On the other hand, while the rotary cultivator R is cultivating a field, the gain control is made less sensitive by decreasing the gain in pace with the cultivating load variation. Thus, the fluctuation is moderated in driving, and the dashing which otherwise, would be caused by hitting against the hard soil is reduced, and the cultivating is facilitated.

The gain control is described above as responding to the rising and lowering of the rotary cultivator R. The gain control, however, may be performed in response to the braking on-and-off, also. Specifically, the gain is reduced so long as the ground working is done with the rotary cultivator R lowered and remaining in the braking-off condition. Also, the PTO engagement or disengagement may be added as still another extra condition, where the gain is controlled in response to the PTO engagement or disengagement in addition to the rising or lowering of the implement R. Specifically the gain is reduced so long as the rotary cultivator R is lowered with the PTO in the off-condition, thereby moderately dealing with the instantaneous load variation caused by the bumpiness of the firm, and preventing the fluctuation in driving and the dashing resulting from the hard soil. Thus, cultivating is facilitated. In this case the low-gain control may continue for a predetermined length of time counted from the instant of appearance of the signal representing the lowering of the rotary cultivator R, and the return to the original follows.

As for the constant vehicle speed control or the constant variator ratio control: in case the rotary cultivator R is rotating in the normal direction, the pressure applied to the variator (S1, S2) is controlled on the speed-reducing side for a predetermined length of time subsequent from the instant of lowering the lifting arms whereas in case the rotary cultivator R is rotating in the opposite direction, the pressure applied to the variator (S1, S2) is controlled on the speed-increasing side for a predetermined length of time subsequent from the instant of lowering the lifting arms.

Figure 9:
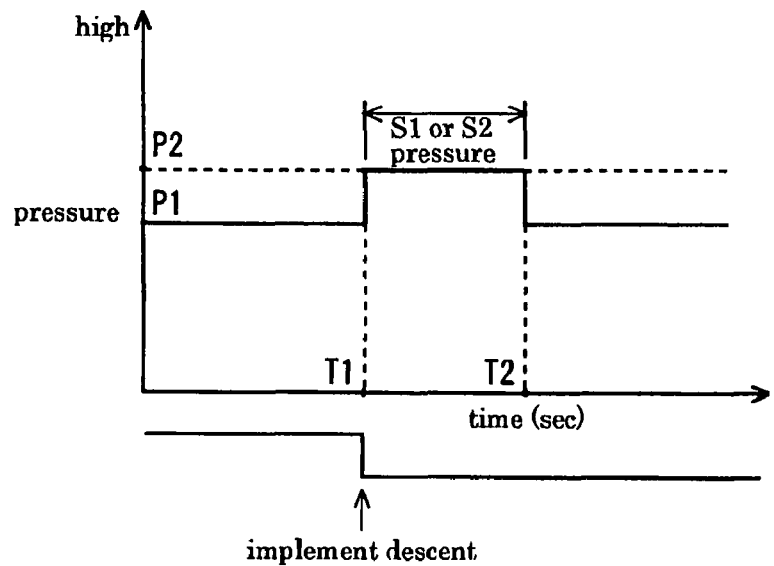
FIG. 9 is a pressure diagram.

Specifically when the rotary cultivator R rises, the operation quantities are calculated on the basis of the difference (error value) between the set value and the measured value to provide a PI control output. When the rotary cultivator R lowers, the control is made by forcedly increasing S1 pressure (P1→P2) on the speed reducing side at the instant of lowering (1 to 2 seconds: T1 to T2) in case the rotary cultivator R is rotating in the normal direction (see FIG. 9) whereas the control is made by forcedly increasing S2 pressure on the speed increasing side in case the rotary cultivator R is rotating in the opposite direction. Such variator control effectively prevents the dashing and abrupt deceleration when the rotary cultivator R is working in the ground working vehicle, of which the toroidal type of continuously variable transmission is responsive to the varying load for changing the variator in location and hence the speed change ratio.

Figure 10:
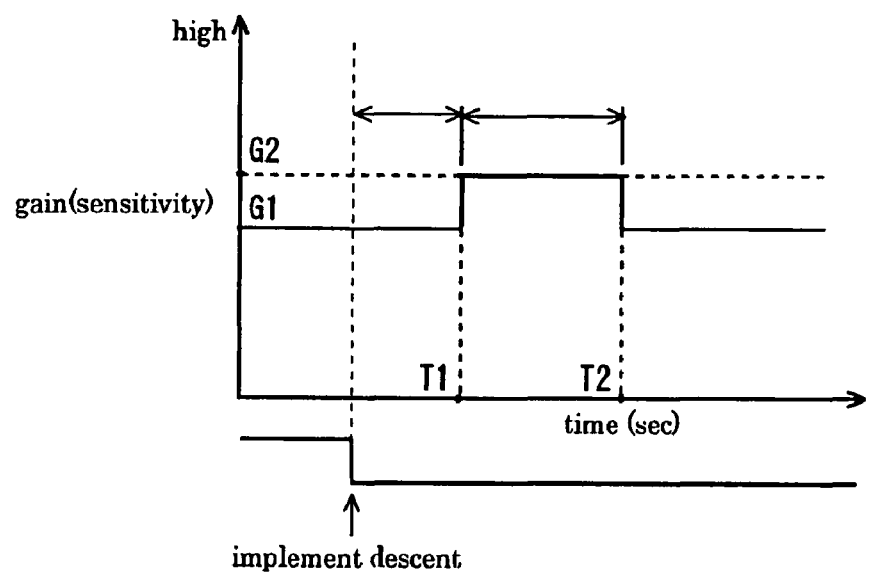
FIG. 10 is a gain diagram.

As for the variator ratio control: the controller may be so designed that the control sensitivity (gain) is raised for a predetermined length of time subsequent to the lowering of the lifting arms. As seen from the gain drawing (FIG. 10), the PI control increases the gain (G1→G2) for a predetermined length of time (T1 to T2) counted from the instant of the lowering of the rotary cultivator R (appearance of the signal representing the lowering of the rotary cultivator R), and then, the gain is made to return to the original G1. Thus, even if the increased gain G2 provided immediately subsequent to the lowering of the rotary cultivator R causes a push to apply to the tractor T via the rotary cultivator R, the vehicle speed is suppressed from increasing, and then, the original gain G1 effectively suppresses the fluctuation.

(Constant Ratio Control)

Another example of constant ratio control is described below. The constant ratio control is selected on the switch panel (FIG. 7a). The controller C is so constructed that it may be responsive to the linear shift signals 26f and 26r for making a decision as to whether the working vehicle is moving forward or backward, limiting the constant ratio control to the to-movement. The speed control using the accelerator pedal 28 is limited to the fro-movement.

Figure 11:
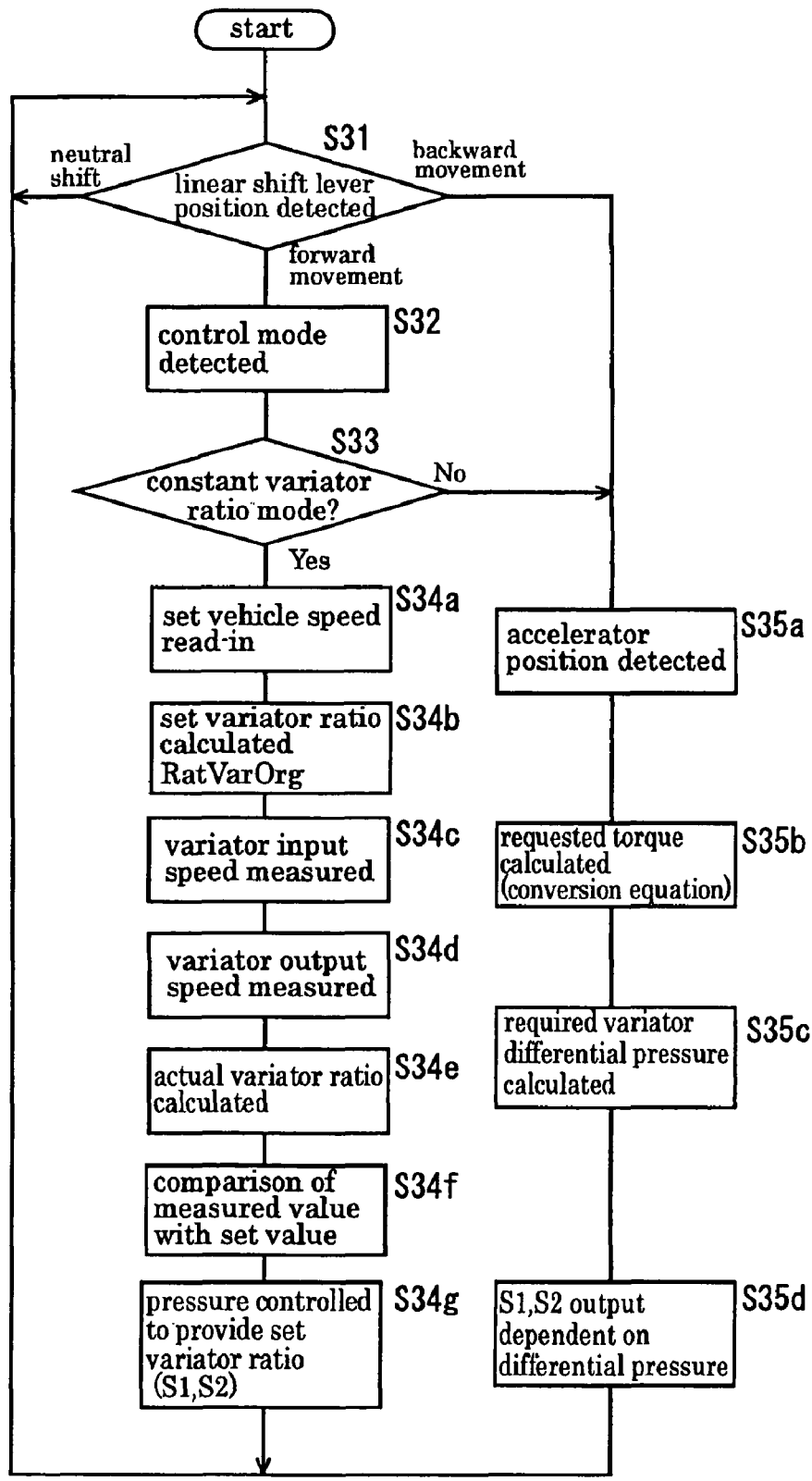
FIG. 11 is a flow chart depicting how the constant ratio control is effected.

Specifically, as seen from the flow chart of FIG. 11, a decision as to whether the working vehicle is moving forward or backward is made by detecting the position of the linear shift lever (S31). In case of the forward movement the working vehicle is made to drive in the constant variator ratio mode, in which the variator ratio is set from a series of speed change procedures (S34a to S34g) following the detection of the control mode and determination of constant variator ratio mode (S32, S33). In case of the backward movement the working vehicle is made to drive with the variator controlled on the basis of the torque, which is determined by the accelerator pedal 28.

Figure 12:
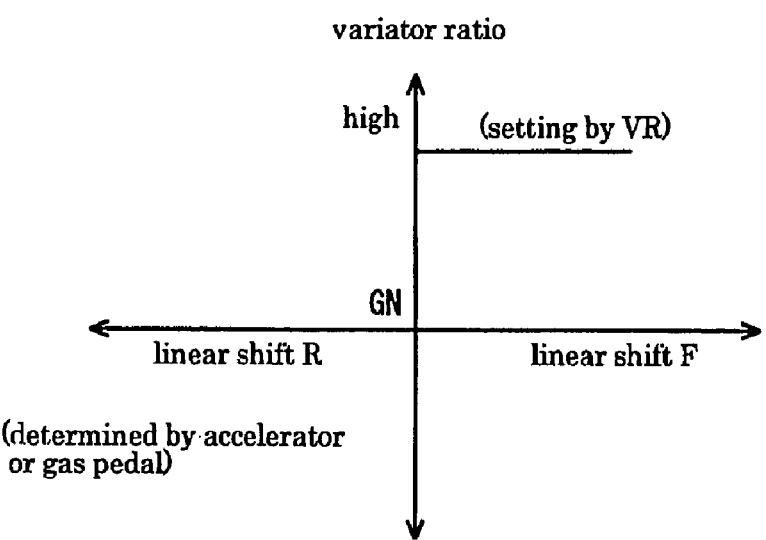
FIG. 12(a) is a diagram of the variator ratio.
FIG. 12(b) shows a mode switching panel.
Figure 12:
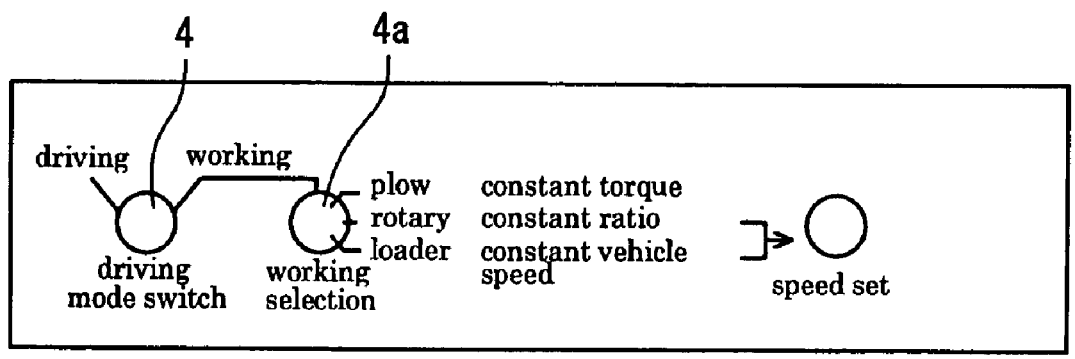

As seen from the variator ratio diagram of FIG. 12 (a), the determination of the speed in the backward movement is left to the driver's discretion to facilitate the driving versatility of permitting for example, the backward speed to increase relative to the forward speed. The variator ratio in the forward movement can be set with the aid of the dial on the mode switching panel FIG. 12 (b).

Figure 13:
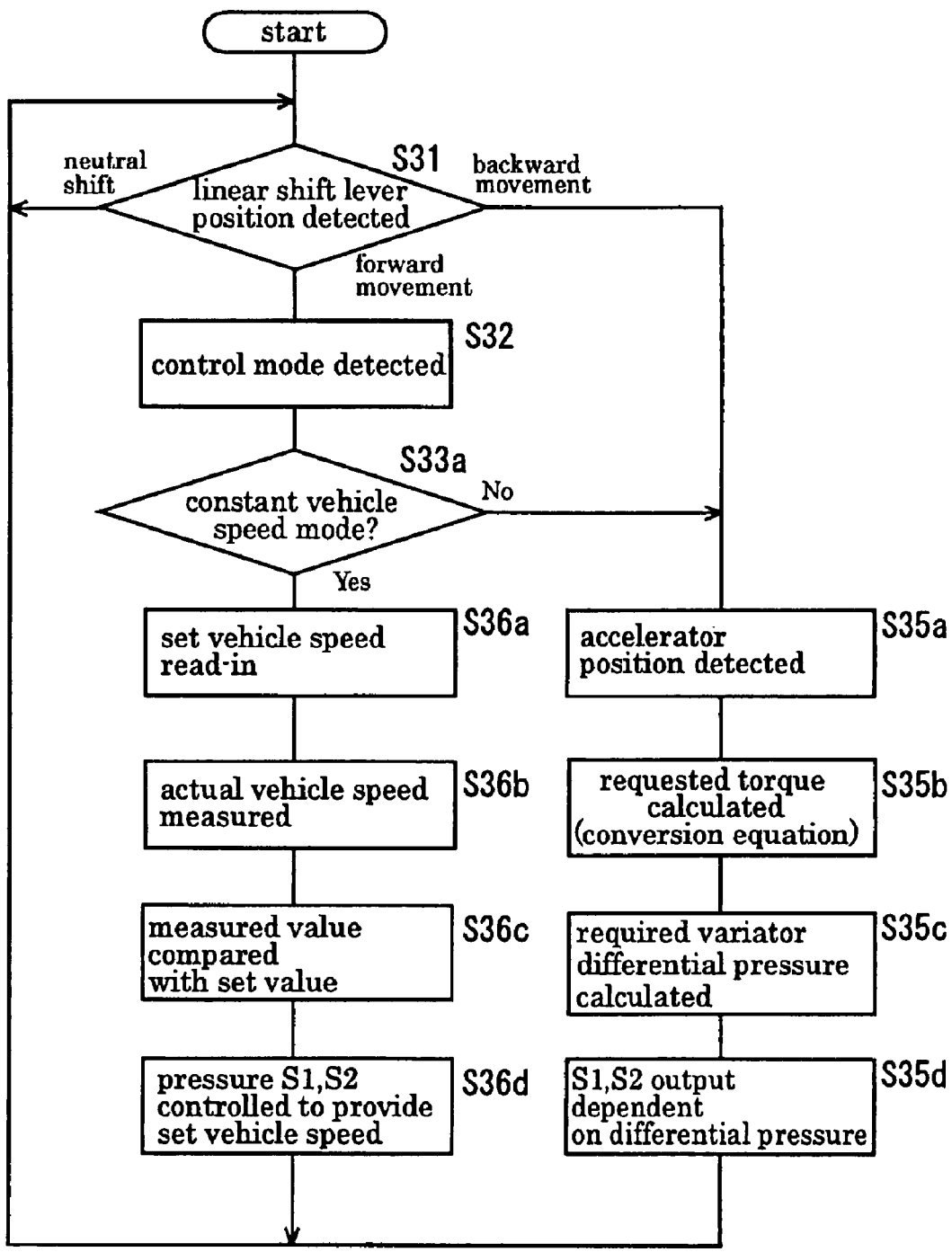
FIG. 13 is a flow chart representative of how the constant speed control is performed.

Similar to the case with the above described constant ratio control, the working vehicle is driven in the constant speed mode, in which a constant speed is set from a series of speed change procedures (S36a to S36d) following the detection of the control mode and determination of the constant speed mode (S32, S33a), as seen from the flow chart of FIG. 13.

Figure 14:
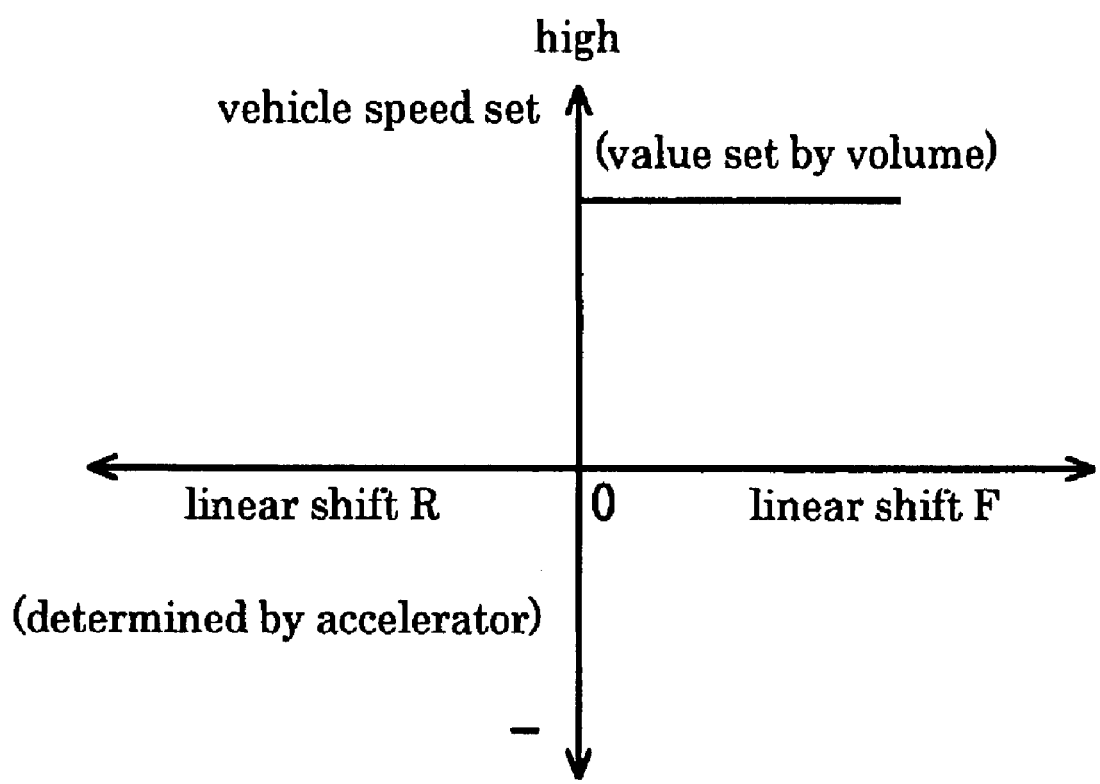
FIG. 14 is a diagram of the constant vehicle speed control.

Such control structure functions similar to the above described constant ratio control to provide similar advantages, as seen from the vehicle speed diagram of FIG. 14.

(Constant Speed Mode)

Figure 15:
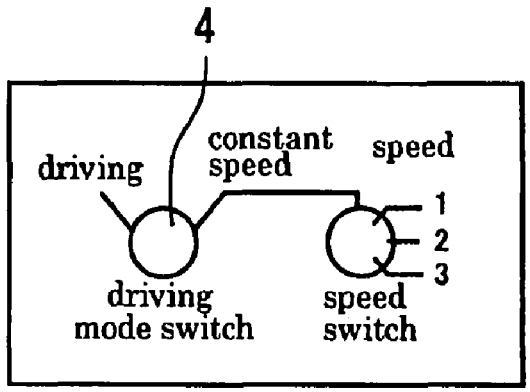
FIG. 15(a) shows a switch panel and FIG. 15(b) is a pressure diagram.
Figure 15:
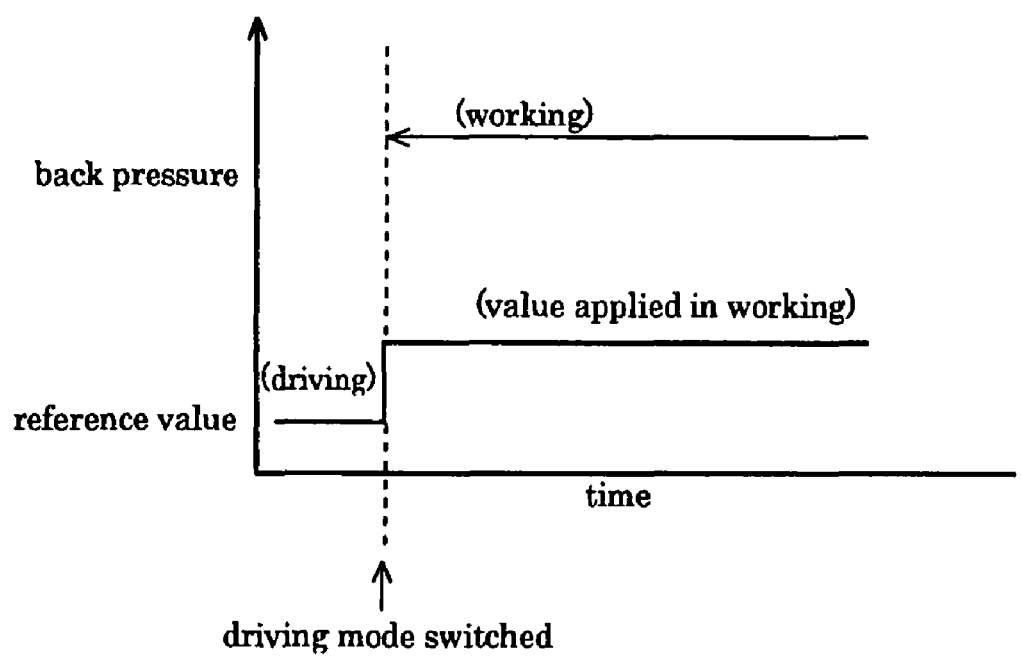

The following description is directed to the control in the constant speed mode. The controller C includes a sensor 3s to determine the instantaneous angle of the lifting arms 3. When the sensor 3s detects the lowering of the ground working implement, the controller C selects the constant speed control mode in which the vehicle speed is kept at a fixed speed by changing the power rollers 1 in position. Thus, the constant speed control is performed on the working vehicle while working, keeping the speed of the working vehicle at a fixed speed irrespective of how largely the tractor load varies. The back pressure applied to the roller cylinder in the constant vehicle speed mode is set to be higher than that in the torque control mode in which the speed change is performed by depressing the accelerator pedal. For example, when the switch panel of FIG. 15 (a) is used to select the "constant speed" mode, the back pressure is increased by a predetermined quantity as seen from the pressure diagram of FIG. 15 (b). Thus, in case of cultivating in the constant speed mode the back pressure is increased to improve the response capability to the varying load, thereby making the workability preferential to other factors in selection. On the other hand, in driving on road the back pressure to be applied to the roller cylinder is reduced, thus making the fuel consumption preferential to other factors in selection.

(Rotary Cultivator Mode)

Now, the working control in the rotary cultivator is described below.

Figure 16:
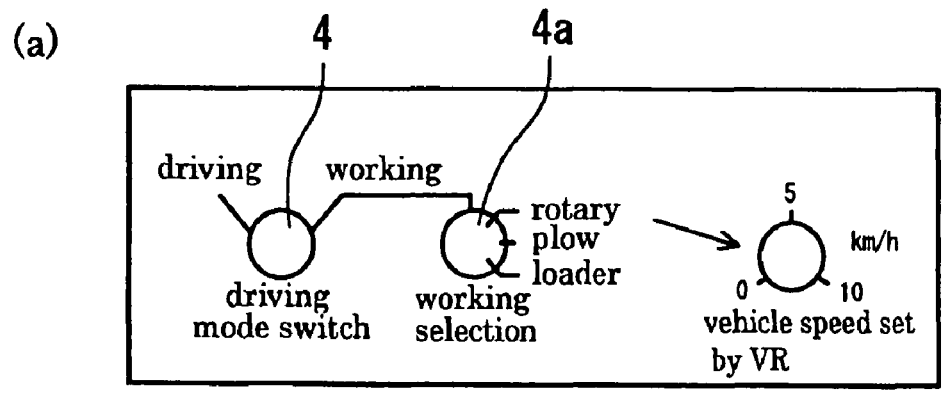
FIG. 16(a) shows a switch panel for the rotary cultivator working and FIG. 16(b) is a pressure diagram.
Figure 16:
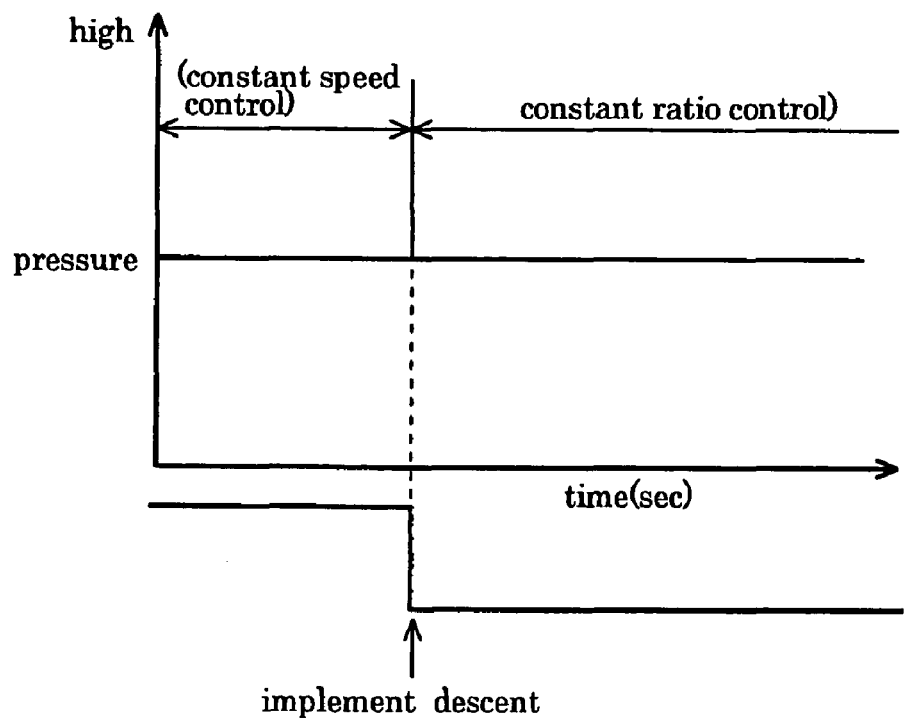

In the "rotary cultivator working" mode selected on the switch panel (FIG. 16(a)), the constant vehicle speed control is performed when the lifting arms 3 are raised as seen from the pressure diagram of FIG. 16(b) whereas the constant variator ratio control is performed when the lifting arms 3 are lowered. The vehicle speed can be selectively set by the vehicle speed setting unit VR on the switch panel. The vehicle speed in the constant ratio control is given in terms of the target variator ratio calculated from the vehicle speed corresponding to the normal revolutions per minute of the engine, which can be set by turning the volume VR of the switch panel.

With the above described arrangement the constant ratio control is performed in cultivating, keeping the cultivating at a fixed pitch; and the constant vehicle speed control is performed while turning, irrespective of the revolutions per minute of the engine. Thus, the working feeling and workability can be significantly improved.

In the rotary cultivator working the variator control for vehicle speed follows any variation in the speed of the PTO, which variation is caused by the varying cultivating load. There is actually provided means for setting the speed change ratio relative to the speed of the PTO as desired. In place of such "speed change ratio setting means" the "cultivating pitch" may be set on the switch panel (FIG. 17(a)).

Figure 17:
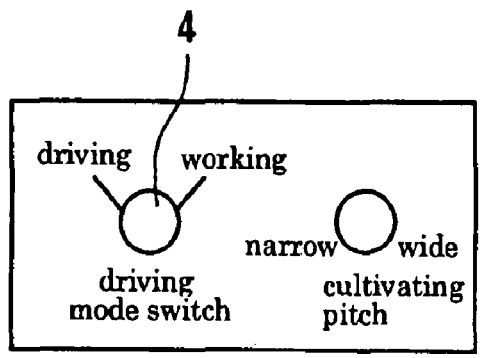
FIG. 17(a) shows a switch panel and FIG. 17(b) is a flow chart.
Figure 17:
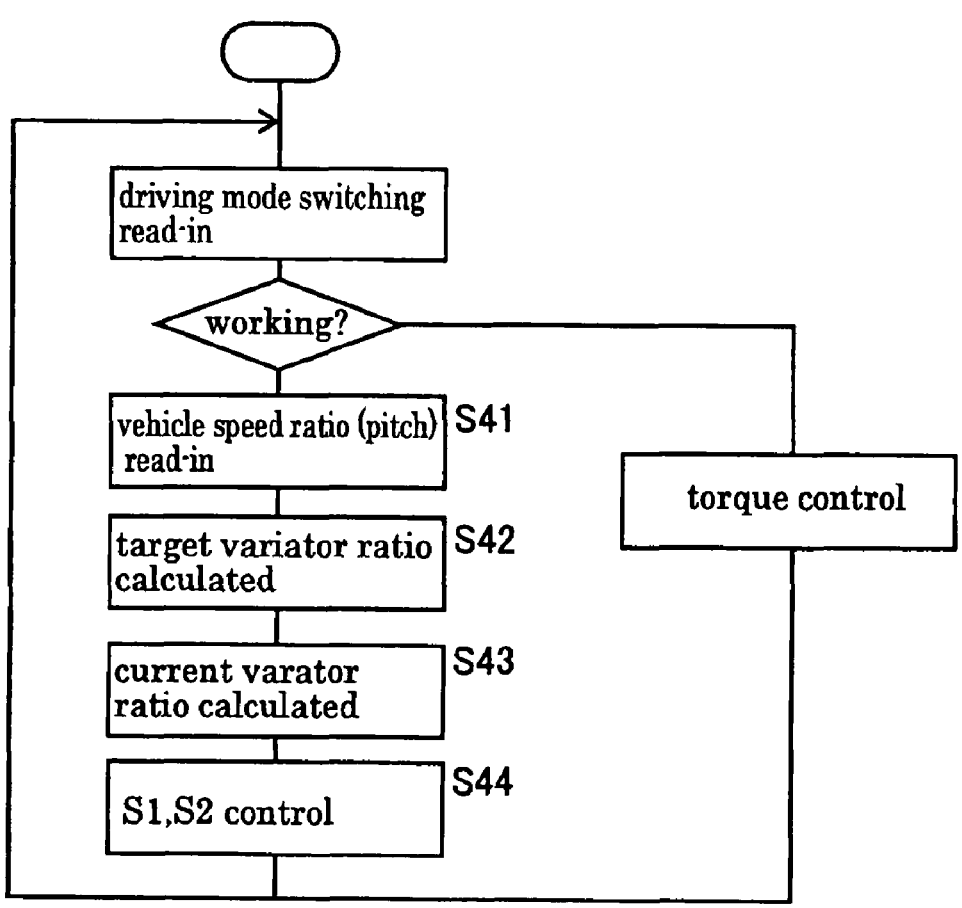

Referring to the flow chart of FIG. 17 (b), the roller cylinders are so controlled in pressure (S1, S2) that the variator ratio may be constant (S41,S44). For example, if the vehicle speed ratio is so set by the volume that the vehicle speed may be in the range of 1 to 4 kilometers per hour (1-4 km/h) for the rated engine speed of 2,500 revolutions per minute, the number of the PTO revolution is proportional with the number of the engine speed. With this arrangement the working precision can be improved, and the cultivating pitch is kept constant. Thus, the problem that if the vehicle speed is kept constant irrespective of the engine speed, the cultivating pitch is inevitably changed has been solved.

Figure 18:
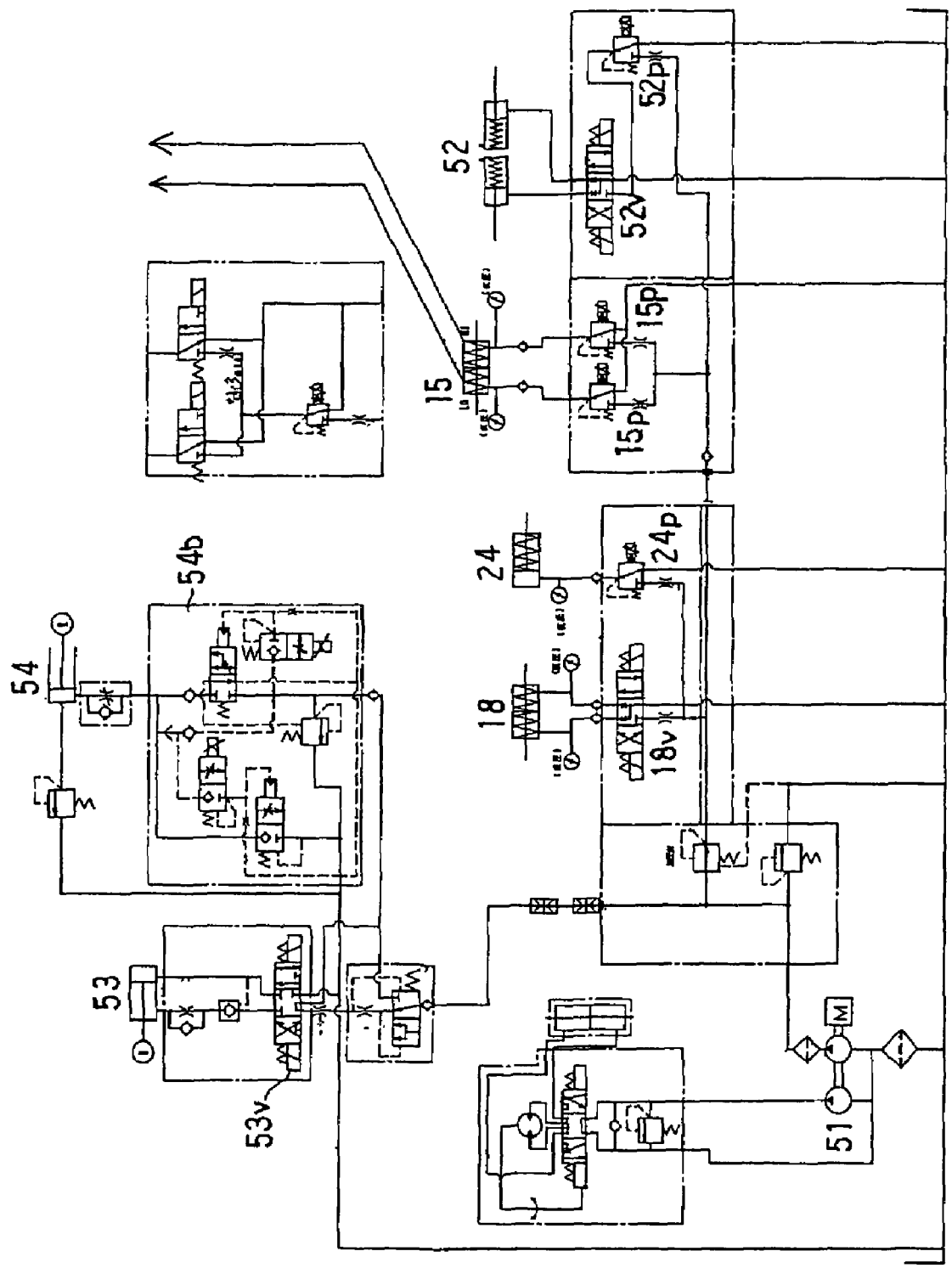
FIG. 18 is a schematic diagram of other hydraulic systems.

As for the other hydraulic controls: as seen from the hydraulic pressure control system of FIG. 18, a hydraulic pump 151 mounted on to the engine body pumps the working oil. The Hi-and-Lo clutch 115, the front wheel acceleration clutch 118 and the PTO clutch are controlled in operation via associated Hi- and Lo- proportional control electrovalves 115p, 115p, 4WD change electrovalve 118v and PTO proportional electrovalve 124p respectively. The left and right brake cylinders 152 and 152, the rolling control cylinder 153, the elevating cylinder 154 and the like are hydraulically controlled in operation.

Figure 19:
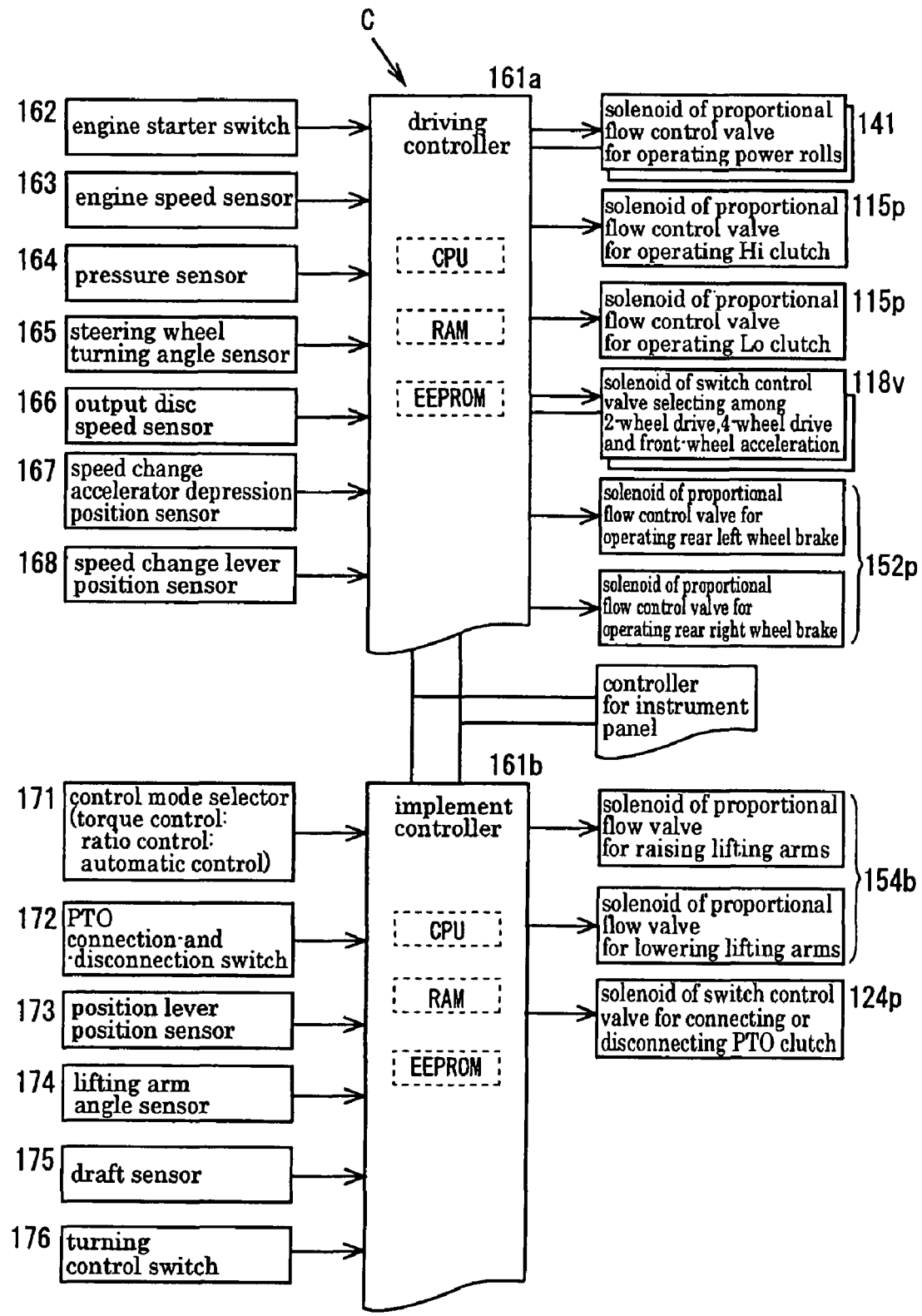
FIG. 19 shows another example of control having different devices on its input and output sides.

The controller (C) comprises a propelling control section 161a and a working control section 161b as shown in the input-and-output block diagram of FIG. 19.

The propelling control section 161a is responsive to the signals from the engine starter switch 162, the pressure sensor 164, the output disc speed sensor 166, the speed change lever position sensor 168 and the like for feeding the signals to the control valves 141 for moving the power rollers 133 back and forth, the control valves 115p for the Hi-Lo clutch 115, the change valve 118v for accelerating the front wheels of the 4 WD and the control valves 152p for the left and right brakes.

The working control section 161b is responsive to the signals from the control mode selector 171, the turning control switch 176 and the like for operating the elevating cylinder 154 of the ground working implement via the valve block 154b and the PTO proportional control electrovalve 124, thereby operating the PTO clutch 124 and hence the PTO or power take-off shaft E. The control mode selector 171 makes a selection among the torque control appropriate for driving on road, the ratio control appropriate for spraying or rotary cultivator work and the automatic control appropriate for the draft work.

(Starter Control)

Figure 20:
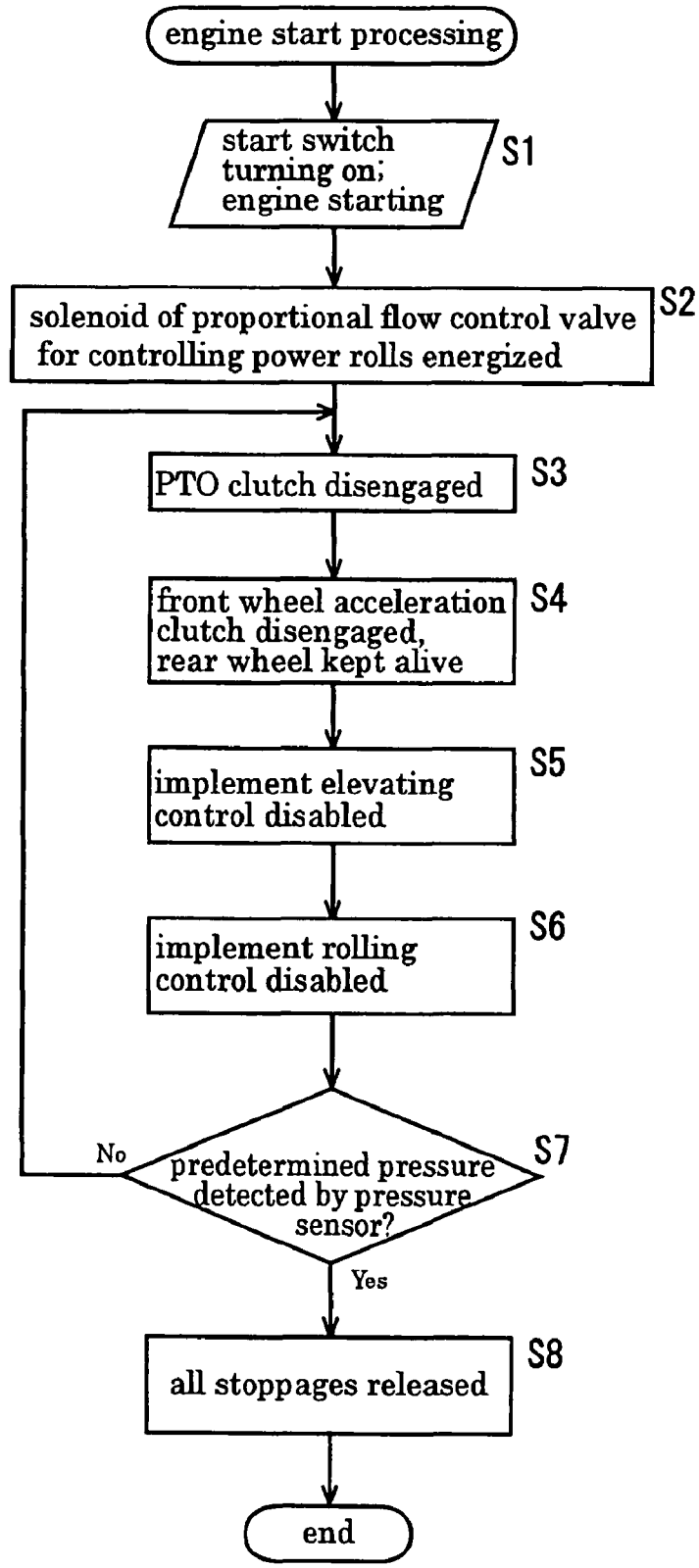
FIG. 20 is a flow chart depicting how the control is effected at the starting of the engine.

Now, the control according to which the engine is made to start is described below. The control procedure is given in the flow chart of FIG. 20. The starter switch 162 turns on (S1) to energize the solenoid valves 141 for moving the power rollers back-and-forth (S2). Then, the electric current is blocked to the PTO proportional control electrovalve 124p to put the PTO clutch 124 in inoperative position (S3); the front wheel acceleration clutch 118v is disengaged to permit the two-wheel drive; the elevating control is prevented via the lifting arm control valve 154b (S5); and the rolling control is prevented via the change valve 153v (S6). A series of stoppages described above are repeated until the pressure sensor 164 detects that a predetermined pressure appropriate for controlling the to-and-fro movement of the power rollers 133 has been reached. (S7). When the predetermined pressure is reached, the series of stoppages are released to put all things in operation (S8).

When the engine is made to start, the series of stoppages above described help to: keep the PTO clutch 124 (located at the output end of the transmission shaft 121) disengaged, thereby preventing the power from travelling downstream from the PTO clutch 124, which is already loaded; and keep the 4WD clutch 118 disengaged, thereby preventing the speed change power division from the output side of the toroidal mechanism 5a from travelling through the sequential stages. The other stoppages along with these effectively help to permit the engine power which otherwise, would be directed to the transmission shaft 121 of the ground working implement to be exclusively used for the speed change operation in the toroidal mechanism 5a.

LIST OF REFERENCE NUMBERS 1 power roller
3 lifting arm
3s lifting arm angle sensor
4 propelling mode selecting switch
4a selector switch
5 propelling transmission
5a toroidal type of variator (continuously variable transmission)
14 hydraulic cylinder for elevating the implement
18s lever position sensor
62 proportional flow control valve
C controller
E engine
R rotary cultivator (ground working implement)
T tractor

What is claimed is:

1. A working vehicle for working while driving, said working performed by a ground working implement articulated with a vehicle body, comprising:
a toroidal type of continuously variable transmission for controlling vehicle speed;
a planet gear type of differential mechanism on a vehicle body;
said toroidal type of continuously variable transmission includes:
a variator input shaft that receives engine power,
two input discs integrally engaged to the variator input shaft to rotate together,
a tubulous variator output shaft coaxially encircling the variator input shaft, and
an output disc integrally engaged to the tubulous variator output shaft,
the variator input shaft, the two input discs, the tubulous variator output shaft, and the output disc are aligned on a common axle;
a variator mechanism that includes a plurality of power rollers that vary an inclination angle by to-and-fro movement of associated cylinder pistons,
the power rollers provided sandwiched between the input discs and the output disc,
the power rollers are hydraulically changed in position,
a variator ratio is a power transmission ratio from the input discs to the output disc,
the variator ratio and a rotation speed of the variator output shaft changes according to a change of the inclination angle of the power rollers,
rotations of said variator input shaft and said variator output shaft are input to said planet gear type of differential mechanism to output a differential power for to-and-fro movement including stop to a driving system; and
a controller to control the variator ratio in the toroidal type of continuously variable transmission for variable-speed driving,
the controller being responsive to any load variation on an output side of the toroidal type of continuously variable transmission for controlling the variator ratio against the load variation, and
the controller being so designed that in the toroidal type of continuously variable transmission for controlling the vehicle speed, the power rollers start changing the inclination angle of the variator mechanism to bring the power rollers to a geared neutral position in response to a starting of an engine, wherein in the geared neutral position an outputting speed from the tubulous variator output shaft is made to stop irrespective of an inputting speed to the variator input shaft, control of the geared neutral position being performed with a PTO clutch disengaged, the PTO clutch being located on a power-transmission path to a ground working implement.

2. A working vehicle for working while driving, said working performed by a ground working implement articulated with a vehicle body, comprising:
a toroidal type of continuously variable transmission for controlling vehicle speed;
a planet gear type of differential mechanism on a vehicle body;
said toroidal type of continuously variable transmission includes:
a variator input shaft that receives engine power,
two input discs integrally engaged to the variator input shaft to rotate together,
a tubulous variator output shaft coaxially encircling the variator input shaft, and
an output disc integrally engaged to the tubulous variator output shaft,
the variator input shaft, the two input discs, the tubulous variator output shaft, and
the output disc are aligned on a common axle;
a variator mechanism that includes a plurality of power rollers that vary an inclination angle by to-and-fro movement of associated cylinder pistons,
the power rollers provided sandwiched between the input discs and the output disc,
the power rollers are hydraulically changed in position,
a variator ratio is a power transmission ratio from the input discs to the output disc,
the variator ratio and a rotation speed of the variator output shaft changes according to a change of the inclination angle of the power rollers, rotations of said variator input shaft and said variator output shaft are input to said planet gear type of differential mechanism to output a differential power for to-and-fro movement including stop to a driving system; and a controller to control the variator ratio in the toroidal type of continuously variable transmission for variable-speed driving, the controller being responsive to any load variation on an output side of the toroidal type of continuously variable transmission for controlling the variator ratio against the load variation, and the controller being so designed that in the toroidal type of continuously variable transmission for controlling the vehicle speed, the power rollers start changing the inclination angle of the variator mechanism to bring the power rollers to a geared neutral position in response to a starting of an engine, wherein in the geared neutral position an outputting speed from the tubulous variator output shaft is made to stop irrespective of an inputting speed to the variator input shaft, control of the geared neutral position being performed with a 4WD clutch disengaged.

3. A working vehicle for working while driving, said working performed by a ground working implement articulated with a vehicle body, comprising:

a toroidal type of continuously variable transmission for controlling vehicle speed;

a planet gear type of differential mechanism on a vehicle body;

said toroidal type of continuously variable transmission includes:
  a variator input shaft that receives engine power,
  two input discs integrally engaged to the variator input shaft to rotate together,
  a tubulous variator output shaft coaxially encircling the variator input shaft, and
  an output disc integrally engaged to the tubulous variator output shaft,
  the variator input shaft, the two input discs, the tubulous variator output shaft, and the output disc are aligned on a common axle;

a variator mechanism that includes a plurality of power rollers that vary an inclination angle by to-and-fro movement of associated cylinder pistons, the power rollers provided sandwiched between the input discs and the output disc, the power rollers are hydraulically changed in position, a variator ratio is a power transmission ratio from the input discs to the output disc, the variator ratio and a rotation speed of the variator output shaft changes according to a change of the inclination angle of the power rollers, rotations of said variator input shaft and said variator output shaft are input to said planet gear type of differential mechanism to output a differential power for to-and-fro movement including stop to a driving system; and a controller to control the variator ratio in the toroidal type of continuously variable transmission for variable-speed driving, the controller being responsive to any load variation on an output side of the toroidal type of continuously variable transmission for controlling the variator ratio against the load variation, and the controller being so designed that in the toroidal type of continuously variable transmission for controlling the vehicle speed, the power rollers start changing the inclination angle of the variator mechanism to bring the power rollers to a geared neutral position in response to a starting of an engine, wherein in the geared neutral position an outputting speed from the tubulous variator output shaft is made to stop irrespective of an inputting speed to the variator input shaft, control of the geared neutral position being performed with an elevating type of ground working implement prevented from rising or lowering.

4. A working vehicle for working while driving, said working performed by a ground working implement articulated with a vehicle body, comprising:

a toroidal type of continuously variable transmission for controlling vehicle speed;

a planet gear type of differential mechanism on a vehicle body;

said toroidal type of continuously variable transmission includes:
  a variator input shaft that receives engine power,
  two input discs integrally engaged to the variator input shaft to rotate together,
  a tubulous variator output shaft coaxially encircling the variator input shaft, and
  an output disc integrally engaged to the tubulous variator output shaft,
  the variator input shaft, the two input discs, the tubulous variator output shaft, and the output disc are aligned on a common axle;

a variator mechanism that includes a plurality of power rollers that vary an inclination angle by to-and-fro movement of associated cylinder pistons, the power rollers provided sandwiched between the input discs and the output disc, the power rollers are hydraulically changed in position, a variator ratio is a power transmission ratio from the input discs to the output disc, the variator ratio and a rotation speed of the variator output shaft changes according to a change of the inclination angle of the power rollers, rotations of said variator input shaft and said variator output shaft are input to said planet gear type of differential mechanism to output a differential power for to-and-fro movement including stop to a driving system; and a controller to control the variator ratio in the toroidal type of continuously variable transmission for variable-speed driving, the controller being responsive to any load variation on an output side of the toroidal type of continuously variable transmission for controlling the variator ratio against the load variation, and the controller being so designed that in the toroidal type of continuously variable transmission for controlling the vehicle speed, the power rollers start changing the inclination angle of the variator mechanism to bring the power rollers to a geared neutral position in response to a starting of an engine, wherein in the geared neutral position an outputting speed from the tubulous variator output shaft is made to stop irrespective of an inputting speed to the variator input shaft, control of the geared neutral position being performed with a rolling control in a ground working implement kept dormant.

* * * * *